US008749401B2

(12) United States Patent
Hara et al.

(10) Patent No.: US 8,749,401 B2
(45) Date of Patent: Jun. 10, 2014

(54) VEHICLE SUPPORT SYSTEMS FOR PEDESTRIANS TO CROSS ROADS AND SUPPORT METHODS FOR PEDESTRIANS TO CROSS ROADS

(75) Inventors: Yoshitaka Hara, Hitachinaka (JP); Takuya Naka, Yachiyo (JP); Saku Egawa, Toride (JP); Masashi Koga, Hachioji (JP)

(73) Assignee: Hitcha, Ltd., Tokyo (JP)

( * ) Notice: Subject to any disclaimer, the term of this patent is extended or adjusted under 35 U.S.C. 154(b) by 518 days.

(21) Appl. No.: 12/963,924

(22) Filed: Dec. 9, 2010

(65) Prior Publication Data

US 2011/0140919 A1 Jun. 16, 2011

(30) Foreign Application Priority Data

Dec. 10, 2009 (JP) ................. 2009-280165

(51) Int. Cl.
*G08G 1/095* (2006.01)

(52) U.S. Cl.
USPC ........ 340/907; 340/908; 340/425.5; 340/916; 340/925; 382/100; 382/103; 382/106

(58) Field of Classification Search
USPC ......... 340/907, 908, 425.5, 916, 925; 701/70, 701/301; 345/3.5; 116/63; 382/103, 106
See application file for complete search history.

(56) References Cited

U.S. PATENT DOCUMENTS

| 6,477,260 B1* | 11/2002 | Shimomura | 382/106 |
| 6,789,015 B2* | 9/2004 | Tsuji et al. | 701/301 |
| 6,806,848 B2* | 10/2004 | Hirao et al. | 345/3.4 |
| 7,209,833 B2* | 4/2007 | Isaji et al. | 701/301 |
| 2002/0183929 A1* | 12/2002 | Tsuji et al. | 701/301 |

(Continued)

FOREIGN PATENT DOCUMENTS

| DE | 10 2007 052 093 | 5/2009 |
| JP | 10-105891 | 4/1998 |

(Continued)

OTHER PUBLICATIONS

Kimio Kanai et al., "Vehicle", Corona Publishing Co., Ltd., 2003.

(Continued)

*Primary Examiner* — Steven Lim
*Assistant Examiner* — Sisay Yacob
(74) *Attorney, Agent, or Firm* — Antonelli, Terry, Stout & Kraus, LLP.

(57) ABSTRACT

A vehicle support system for supporting a man in safely crossing a road without crosswalks installed is provided. The vehicle support system includes a man-detecting unit detecting a man, a subject-vehicle-position detecting unit detecting a position of a vehicle, a man-position/waiting-score calculating unit determining the detected man to be a potential-crossing-man who may cross the road, calculating an absolute position of the potential-crossing-man, measuring waiting time of the potential-crossing-man to cross the road, calculating a waiting score, and storing the result in a man-position/waiting-score storing unit, a stopping-vehicle determining unit determining whether or not the vehicle should be stopped based on the position and the waiting score of the potential-crossing-man, a travelling controller stopping the vehicle when the vehicle should be stopped, and a pedestrian-crossing-signal display unit displaying information indicating whether or not crossing the road is safe based on an instruction of the stopping-vehicle determining unit.

13 Claims, 16 Drawing Sheets

(56) References Cited

U.S. PATENT DOCUMENTS

| | | | |
|---|---|---|---|
| 2004/0207519 A1 | 10/2004 | Tracy | |
| 2005/0159893 A1* | 7/2005 | Isaji et al. | 701/301 |
| 2005/0201590 A1* | 9/2005 | Kudo | 382/103 |
| 2009/0140845 A1* | 6/2009 | Hioki | 340/425.5 |
| 2011/0184617 A1* | 7/2011 | Hegemann et al. | 701/70 |

FOREIGN PATENT DOCUMENTS

| | | |
|---|---|---|
| JP | 2002-074595 | 3/2002 |
| JP | 2002-175590 | 6/2002 |
| JP | 2005-234694 | 9/2005 |
| JP | 2010-072807 | 4/2010 |
| JP | 2010-072973 | 4/2010 |
| JP | 2010-181928 | 8/2010 |
| WO | WO 2009/141092 | 11/2009 |

OTHER PUBLICATIONS

JP Application No. 2009-296670, with English abstract, Dec. 17, 2009.

* cited by examiner

US 8,749,401 B2

VEHICLE SUPPORT SYSTEMS FOR PEDESTRIANS TO CROSS ROADS AND SUPPORT METHODS FOR PEDESTRIANS TO CROSS ROADS

CROSS-REFERENCE TO RELATED APPLICATION

The present application claims priority under 35 USC 119 to Japanese Patent Application No. 2009-280165 filed on Dec. 10, 2009 the entire contents of which are hereby incorporated by reference.

BACKGROUND OF THE INVENTION

1. Field of the Invention

The present invention relates to a pedestrian-crossing support system, mounted in a vehicle, such as an autonomous vehicle or a passenger automobile, for supporting a pedestrian in safely crossing a road at any place, and a method for supporting a pedestrian in crossing a road.

2. Description of the Related Art

Conventionally, an apparatus mounted in a vehicle for supporting avoidance of a crash has been disclosed in, for example, Japanese Patent Laid-Open No. H10-105891, the entire contents of which are hereby incorporated by reference. Such vehicle support apparatus detects an obstacle, including a pedestrian, around a vehicle, and, when the vehicle is determined to have a risk of crashing into the obstacle, stops the vehicle, or warns the vehicle driver.

An apparatus for supporting a pedestrian in safely crossing a road at a crosswalk which has been installed on the road is disclosed in, for example, Japanese Patent Laid-Open No. 2002-175590, the entire contents of which are hereby incorporated by reference.

The conventional art enables avoidance of a crash between a vehicle and a pedestrian running into a roadway, and enables a pedestrian to be supported in safely crossing a road at a crosswalk already installed on the road.

However, the conventional art has a difficulty in avoiding harsh braking of the vehicle when a pedestrian runs into a roadway having no crosswalk, and enabling the pedestrian to safely cross the roadway.

On a road having no crosswalk, neither a crosswalk nor a traffic signal for pedestrians is present, and thus a pedestrian has a difficulty in safely crossing a road. Since no equipment for supporting a pedestrian in crossing a road is present on a road, the pedestrian needs to check a travelling vehicle visually to determine whether or not the pedestrian can safely cross the road. However, visual checking of a vehicle by a pedestrian has a limitation, and particularly, it is difficult for the pedestrian to predict how a vehicle is going to move.

Installation of equipment on a road, such as a crosswalk or a traffic signal for pedestrians, enables a pedestrian to safely cross the road. To enable a pedestrian to safely crossing a road at any place where the pedestrian wants to cross, a large number of equipment, such as crosswalks and traffic signals for pedestrians, are required. This leads to a problem of high cost of installation of the equipment.

SUMMARY OF THE INVENTION

The present invention has been made to solve the above problem. An object thereof is to provide a vehicle support system for supporting a man in safely crossing roads and a method for supporting a man in crossing roads.

To achieve the object, a vehicle according to the present invention serves as a traffic signal for pedestrians. The vehicle, which is a risk for, for example, a pedestrian or a bicyclist, serving as a traffic signal for pedestrians ensures that a traffic signal for pedestrians is present any time around the risk, which is the vehicle. Also, the vehicle serving as a traffic signal for pedestrians has an advantage of enabling a pedestrian to be informed how the vehicle is going to move.

The vehicle support system for men to cross roads of the present invention is a vehicle system for supporting a man in safely crossing a road at any place. To avoid a crash, the vehicle support system includes: a man-detecting unit detecting a man as a potential-crossing-man who may cross the road; a subject-vehicle-position detecting unit; a man-position/waiting-score calculating unit (for example, a man-position/waiting-score calculating unit 5) calculating position information regarding the potential-crossing-man as a man position based on position information from the man-detecting unit and the subject-vehicle-position detecting unit, measuring waiting time of the potential-crossing-man to cross the road, calculating a waiting score, which is an index of waiting time, and storing the calculated result in a man-position/waiting-score storing unit (for example, a man-position/waiting-score storing unit 6); a stopping-vehicle determining unit determining whether or not the vehicle should be stopped to enable a man to safely cross the road, based on the man position and the waiting score of the potential-crossing-man; a travelling controller stopping the vehicle when the stopping-vehicle determining unit determines that the vehicle should be stopped; and a man-crossing-signal display unit (for example, a pedestrian-crossing-signal display unit 13) displaying information indicating whether or not the man can safely cross the road.

The present invention can support a pedestrian in safely crossing a road.

DETAILED DESCRIPTION OF THE PREFERRED EMBODIMENT

An embodiment of the present invention will be described in detail with reference to the drawings.

Figure 1:
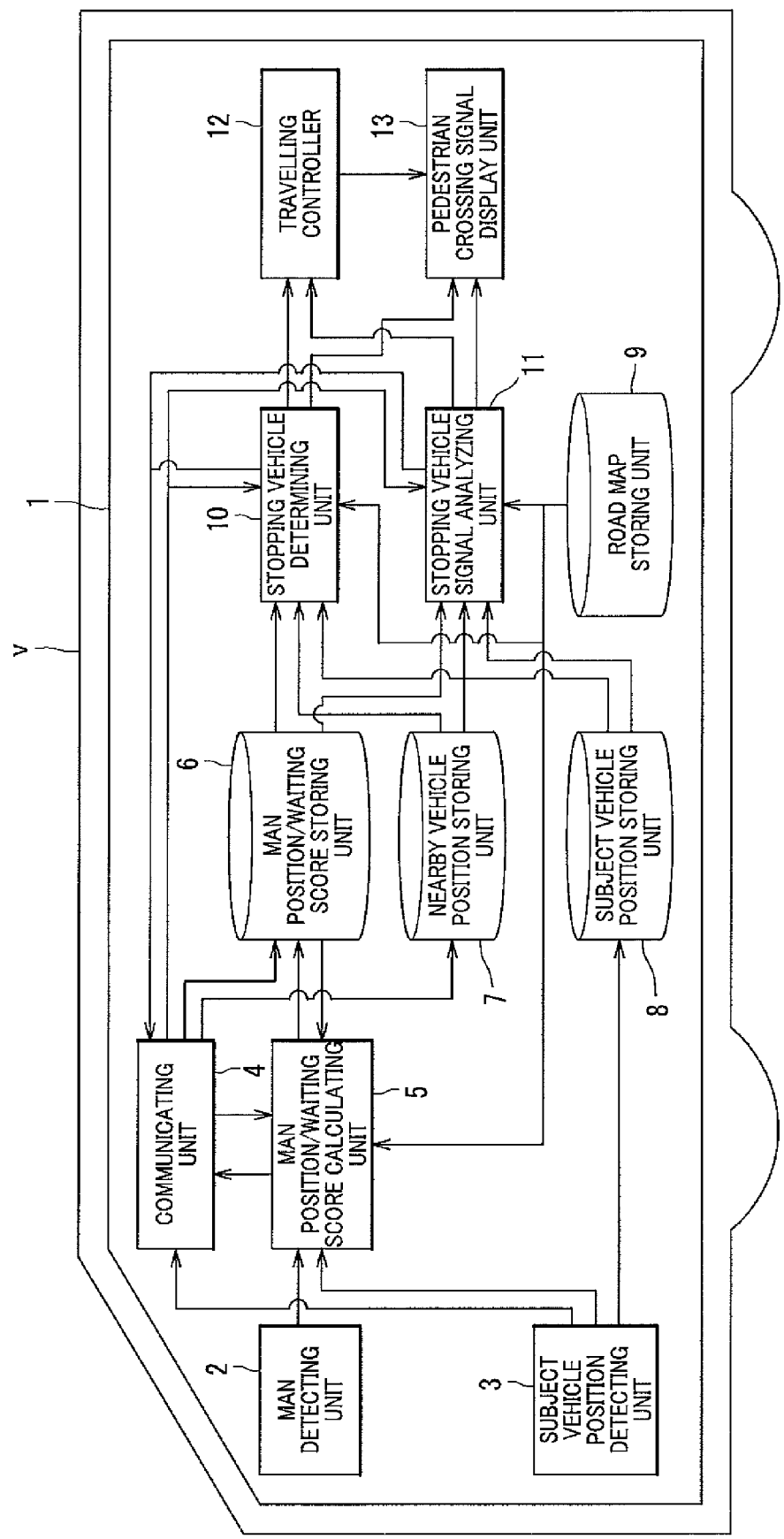
FIG. 1 is a block diagram showing a configuration of a pedestrian-crossing support system.

FIG. 1 is a block diagram showing a configuration of a pedestrian-crossing support system. A pedestrian-crossing support system 1 (i.e., a vehicle support system for men to cross roads) is mounted in a vehicle v, such as an autonomous vehicle or a passenger automobile, and supports a man m, such as a pedestrian or a bicyclist, in safely crossing a road on which the vehicle v travels. A vehicle v may include either "a subject vehicle v", which is a vehicle of interest, or "a nearby vehicle v", which is a vehicle present around the subject vehicle.

The pedestrian-crossing support system 1 includes a man-detecting unit 2, a subject-vehicle-position detecting unit 3 (i.e., a vehicle-position detecting unit), a communicating unit 4, a man-position/waiting-score calculating unit 5, a man-position/waiting-score storing unit 6, a nearby-vehicle-position storing unit 7, a subject-vehicle-position storing unit 8, a road-map storing unit 9, a stopping-vehicle determining unit 10, a stopping-vehicle-signal analyzing unit 11, a travelling controller 12, and a pedestrian-crossing-signal display unit 13 (i.e., a man-crossing-signal display unit).

The above components will be described individually.

The man-detecting unit 2 detects a man m, such as a pedestrian or a bicyclist, who is present in a travelling direction of a subject vehicle v, and obtains relative position information regarding the man m relative to the subject vehicle v. According to the embodiment, the man-detecting unit 2 may also detect prestored action patterns, for example, a gesture (an action) of raising a hand, in addition to the relative position information. A specific method/apparatus for detecting action patterns has been well-known. Means for detecting a man m on an open road is disclosed in, for example, Japanese Patent Laid-Open No. 2002-74595 entitled "Support System for Safe Driving of Vehicle", the entire contents of which are hereby incorporated by reference. The way of obtaining a relative position is disclosed in, for example, Japanese Patent Laid-Open No. 2005-234694 entitled "Vehicle Exterior Monitoring System", the entire contents of which are hereby incorporated by reference. Recognition of gestures is proposed by, for example, Kinect (http://www.xbox.com/en-US/kinect).

The subject-vehicle-position detecting unit 3 obtains a current position (i.e., an absolute position on the ground) of the subject vehicle v. Specific methods/apparatuses for detecting a current position have been well-known. Such technique is, for example, Real Time Kinematic Global Positioning System (RTK-GPS), which is a kind of Global Navigation Satellite System (GNSS). Another technique is a self-position estimation technique using a landmark described in "Vehicle" (Kimio Kanai et al., CORONA PUBLISHING CO., LTD., 2003, pp. 153-173, ISBN: 978-4-339-03363-2), the entire contents of which are hereby incorporated by reference.

The communicating unit 4 performs communication between the subject vehicle v and a nearby vehicle v around the subject vehicle v. Specific methods/apparatuses for communication have been well-known. Examples of such technique include "Experimental Guideline for Inter-Vehicle Communications System using the 5.8 GHz-band (ITS FORUM RC-005)" and "Experimental Guideline for Vehicle Communications System using 700 MHz-Band (ITS FORUM RC-006)" developed by ITS Info-communications Forum (http://www.itsforum.gr.jp/), and IEEE802.11p and IEEE 1609 developed by IEEE (http://www.ieee.org/). To communicate with the nearby vehicle v around the subject vehicle v, a routing technique on a position basis is required. Such technique is well-known as geo-routing. A procedure for communication will be described in detail below.

The man-position/waiting-score calculating unit 5 calculates an absolute position of the man m using the relative position information regarding the man m (i.e., a potential-crossing-man who may cross a road) relative to the subject vehicle v obtained by the man-detecting unit 2 and the absolute position information regarding the subject vehicle v obtained by the subject-vehicle-position detecting unit 3. The man-position/waiting-score calculating unit 5 also calculates an index of waiting time, called herein a waiting score a, by measuring the waiting time of the man to cross a road. According to the embodiment, the man-position/waiting-score calculating unit 5 determines the gestures as in the description of the man-detecting unit 2. Action patterns of the gestures may be stored in the man-position/waiting-score storing unit 6. The procedure of the man-position/waiting-score calculating unit 5 will be described in detail below with reference to FIG. 4.

The man-position/waiting-score storing unit 6 stores the absolute position and the waiting score a of the man m, calculated by the man-position/waiting-score calculating unit 5. The absolute position and the waiting score a of the man m may be result values which are calculated by a man-position/waiting-score calculating unit 5a (not shown) mounted in the nearby vehicle v, and are obtained through the communicating unit 4.

The nearby-vehicle-position storing unit 7 obtains a current position of the nearby vehicle v obtained by a subject-vehicle-position detecting unit 3a (not shown) mounted in the nearby vehicle v through the communicating unit 4, and stores the obtained position.

The subject-vehicle-position storing unit 8 stores the current position of the subject vehicle obtained by the subject-vehicle-position detecting unit 3 mounted in the subject vehicle v.

The road-map storing unit 9 stores a map (i.e., road map information) including road information regarding the surrounding of the subject vehicle v travelling. The map stored in the road-map storing unit 9 is equivalent to a road map used in a car navigation system, and includes information, such as an intersection position, the number of lanes, one-way traffic, and a no-stopping zone.

The road-map storing unit 9 also stores a road map including position information regarding a waiting zone w for crossing a road and a sidewalk p described below. The waiting zone w and the sidewalk p can be represented in two ways: a map representation using absolute coordinates to define positions of the waiting zone w and the sidewalk p; and a map representation using a relative distance from a road shoulder, in which, for example, the waiting zone may be defined at a position with a distance of a predetermined meter from the road shoulder, and the sidewalk may be defined at a position with a distance of a predetermined meter from the road shoulder. Specifically, in the road map information, the waiting zone w and the sidewalk p (see FIG. 3) may be each represented as an area with a distance of a predetermined meter from the roadway d (see FIG. 3) in a predetermined section of the road map. The road map information may also include information regarding the waiting zone w and the sidewalk p as section information of a specific road, such as "Rout XX".

The stopping-vehicle determining unit 10 determines whether or not the subject vehicle v should be stopped to enable the man m to safely cross the road, using the information regarding the position and the waiting score a of the man m stored in the man-position/waiting-score storing unit 6, the position information regarding the nearby vehicle v stored in the nearby-vehicle-position storing unit 7, the position information regarding the subject vehicle v stored in the subject-vehicle-position storing unit 8, and the road map information stored in the road-map storing unit 9. When the waiting score a exceeds a stopping-vehicle threshold x, the subject vehicle v is stopped. When it is determined that the subject vehicle v should be stopped, a stopping-vehicle signal of stopping the subject vehicle v is transmitted to a stopping-vehicle-signal analyzing unit 11a (not shown) mounted in the nearby vehicle v using the communicating unit 4. The procedure of the stopping-vehicle determining unit 10 will be described in detail below with reference to FIG. 14.

The stopping-vehicle-signal analyzing unit 11 receives a stopping-vehicle signal transmitted from a stopping-vehicle determining unit 10a mounted in the nearby vehicle v, and determines a stopping position of the subject vehicle v using the position information regarding the nearby vehicle v stored in the nearby-vehicle-position storing unit 7, the position information regarding the subject vehicle v stored in the subject-vehicle-position storing unit 8, and the road map information stored in the road-map storing unit 9. The procedure of the stopping-vehicle-signal analyzing unit 11 will be described in detail below with reference to FIG. 15.

The travelling controller 12 has a function of driving the subject vehicle v to a destination, and a function of stopping the subject vehicle v when the stopping-vehicle determining unit 10 or the stopping-vehicle-signal analyzing unit 11 determines that the subject vehicle v should be stopped. The function of driving can use a known technique described in, for example, "Vehicle" (Kimio Kanai et al., CORONA PUBLISHING CO., LTD., 2003, pp. 174-199, ISBN:978-4-339-03363-2), the entire contents of which are hereby incorporated by reference.

The pedestrian-crossing-signal display unit 13, mounted in the subject vehicle v, is a traffic signal, which informs the man m whether or not the man m can safely cross the road. When the stopping-vehicle determining unit 10 or the stopping-vehicle-signal analyzing unit 11 determines that the subject vehicle v should be stopped, and the travelling controller 12 stops the subject vehicle v, the pedestrian-crossing-signal display unit 13 displays a signal indicating that the man m is safe in crossing the road. Otherwise, the pedestrian-crossing-signal display unit 13 displays a signal indicating that the man m is unsafe in crossing the road.

Figure 2:
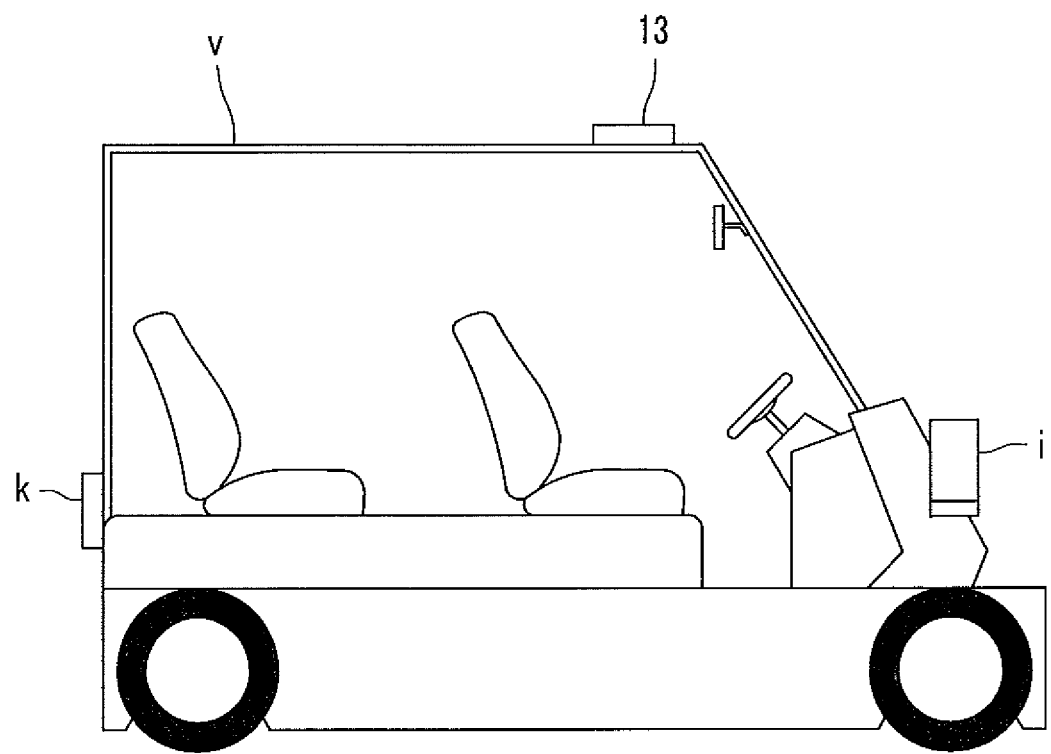
FIG. 2 is a side sectional view of a vehicle having the pedestrian-crossing support system.

FIG. 2 is a side sectional view of a vehicle having the pedestrian-crossing support system. With reference to FIG. 2, an embodiment of the pedestrian-crossing-signal display unit 13 of the vehicle v having the pedestrian-crossing support system 1 will be described hereinafter.

The pedestrian-crossing-signal display unit 13 is an electric light, similar to a headlight i or a taillight k, and employs, for example, a light emitting diode (LED). The pedestrian-crossing-signal display unit 13 is installed in a position where the man m around the vehicle v can easily see the pedestrian-crossing-signal display unit 13. For example, the pedestrian-crossing-signal display unit 13 is installed on the sidewalk side on the roof of the vehicle v. Unlike the headlight i and the taillight k, the pedestrian-crossing-signal display unit 13 turns on, for example, blue light, blue flashing light, red light, or no light in response to an instruction from the stopping-vehicle determining unit 10 or the stopping-vehicle-signal analyzing unit 11. When the vehicle v is stopped, and the man m can safely cross the road, blue light is turned on to inform the man m that the man m can cross the road. When the vehicle v is stopped, but the vehicle v will start travelling in a predetermined time, blue flashing light is turned on to inform the man m that the vehicle v will start travelling in the predetermined time. When the vehicle v is travelling, that is, the man m is unsafe in crossing the road, red light is turned on to inform the man m that crossing the road is unsafe. When the vehicle v is stopped, but the system cannot determine whether or not the man m can safely cross the road, light is turned off.

Figure 3:
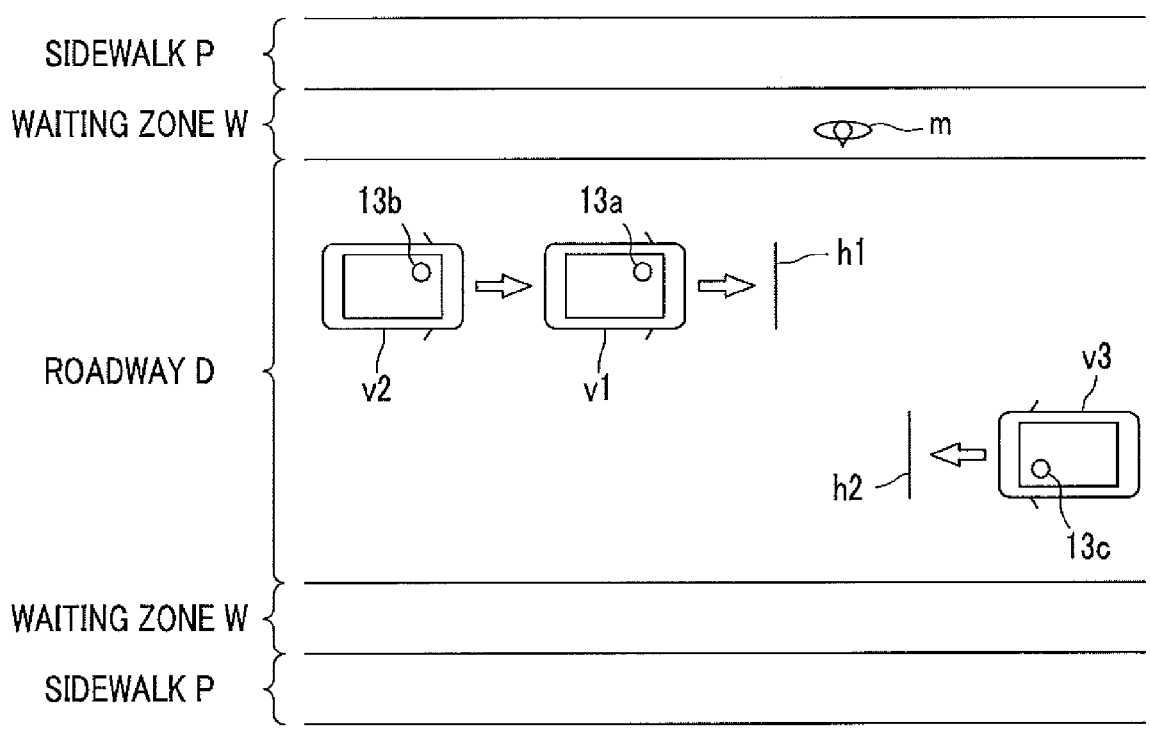
FIG. 3 is a plan view showing a situation in which vehicles having the pedestrian-crossing support system travel.

FIG. 3 is a plan view showing a situation in which vehicles having the pedestrian-crossing support system travel. With reference to FIG. 3, operations of the vehicle v having the pedestrian-crossing support system 1 will be described.

According to the embodiment of the present invention, the waiting zone w is present between the roadway d and the sidewalk p. The waiting zone w is for a man m who has a will to cross the road to wait. The waiting zone w can be readily installed by drawing a white line on the ground, so that the installation cost becomes inexpensive. Information regarding whether or not there is a waiting zone w is included in the map information, and the road-map storing unit 9 stores the road map information.

In, at least, either case where a man m, who may cross the road, stands still in the waiting zone w for a predetermined time period (for example, the man m does not move more than three meters for one minute), or where the man m makes a predetermined gesture, such as raising a hand, in the waiting zone w for a predetermined time period, the pedestrian-crossing support system 1 determines that the man m has a will to cross the road, stops the vehicle v before the man m, and informs the man m that the man m can safely cross the road by turning on blue light with the pedestrian-crossing-signal display unit 13.

For example, when a pedestrian-crossing support system 1a (not shown) mounted in a vehicle v1 shown in FIG. 3 determines that the man m has a will to cross the road, the vehicle v1 stops at a stopping position h1 before the man m, and turns on blue light with a pedestrian-crossing-signal display unit 13a.

The pedestrian-crossing support system 1a transmits information indicating that the vehicle v1 is going to stop, to nearby vehicles v in a predetermined distance from the vehicle v1 (for example, within 100 m) using the communicating unit 4. A vehicle v2 travelling in the same lane as the vehicle v1 receives this information, stops behind the vehicle v1, and turns off light with a pedestrian-crossing-signal display unit 13b. A vehicle v3 travelling in the opposite lane of the vehicle v1 stops at a stopping position h2 before the man m, and turns on blue light with a pedestrian-crossing-signal display unit 13c.

The vehicle v stops and turns on blue light with the pedestrian-crossing-signal display unit 13, and then in, at least, either case where the man m has crossed the road, or where a predetermined time period has elapsed, to restart travelling of the vehicle v, the pedestrian-crossing support system 1 turns on blue flashing light with the pedestrian-crossing-signal display unit 13, and thereby informs the man m that the vehicle v will start travelling in a predetermined time. In the case where the vehicle v stops, and turns off light with the pedestrian-crossing-signal display unit 13, blue flashing light will not be turned on with the pedestrian-crossing-signal display unit 13.

The vehicle v which is travelling turns on red light with the pedestrian-crossing-signal display unit 13 to inform the man m that crossing the road is unsafe.

Figure 4:
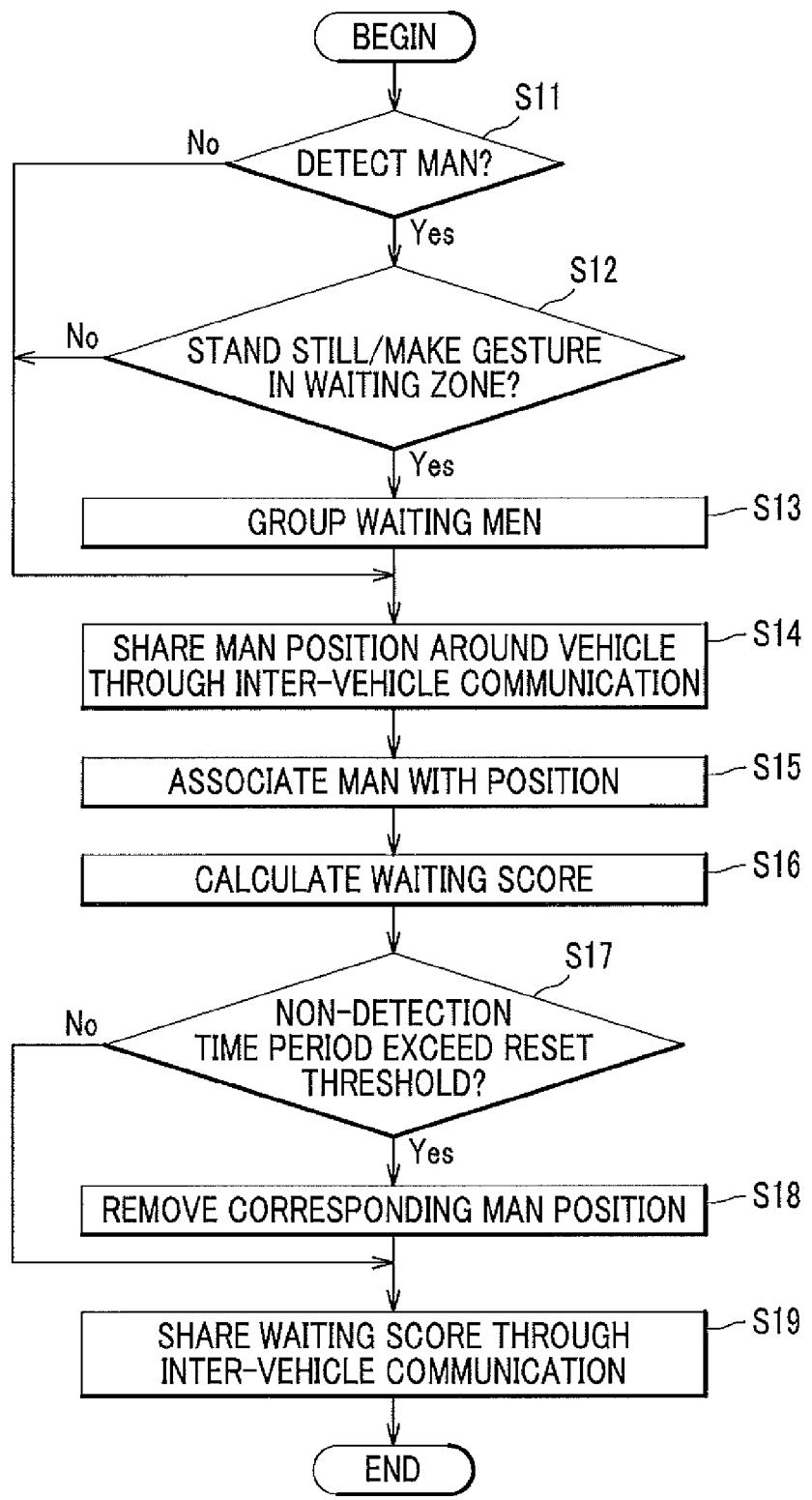
FIG. 4 is a flowchart showing a procedure of a man-position/waiting-score calculating unit in the pedestrian-crossing support system.

FIG. 4 is a flowchart showing the procedure of the man-position/waiting-score calculating unit in the pedestrian-crossing support system. With reference to the flowchart shown in FIG. 4, the procedure of the man-position/waiting-score calculating unit 5 will be described. The man-position/waiting-score calculating unit 5 repeatedly executes the procedure of the flowchart shown in FIG. 4 at a predetermined time interval. The predetermined time interval is equal to the cycle of the man-detecting unit 2 detecting the man m.

First, the man-position/waiting-score calculating unit 5 determines whether or not the man-detecting unit 2 detects a man m, such as a pedestrian or a bicyclist, in a travelling direction of the subject vehicle v (Step S11). If the man-detecting unit 2 detects one or more men m (multiple men m may be detected in some cases) (Step S11, Yes), the process proceeds to Step S12. Otherwise, if no man m is detected (Step S11, No), the process proceeds to Step S14.

Then, when the man-detecting unit 2 detects a man m, the man-position/waiting-score calculating unit 5 determines whether or not the man m stands still or makes a gesture, such as raising a hand, in the waiting zone w, and thereby determines whether or not the detected man m has a will to cross the road (Step S12). When multiple men m are detected, the man-position/waiting-score calculating unit 5 determines whether or not each of the men m stands still or makes the above gesture. For the determination, the man-position/waiting-score calculating unit 5 obtains the relative position information regarding the man m relative to the subject vehicle v detected by the man-detecting unit 2. According the embodiment, the man-position/waiting-score calculating unit 5 may also obtain posture information regarding the gesture of the man m detected by the man-detecting unit 2.

The man-position/waiting-score calculating unit 5 obtains the absolute position information regarding the subject vehicle v obtained by the subject-vehicle-position detecting unit 3. The man-position/waiting-score calculating unit 5 calculates an absolute position of the man m, using the relative position information regarding the man m relative to the subject vehicle v and the absolute position information regarding the subject vehicle v. The man-position/waiting-score calculating unit 5 also obtains a position of the waiting zone w from the road-map storing unit 9. Using the obtained information, the man-position/waiting-score calculating unit 5 determines whether or not the man m is in the waiting zone w.

Then, the man-position/waiting-score calculating unit 5 determines whether or not the man m has a will to cross the road, in such a manner, for example, that, at least, in either case where the man m does not move more than three meters in the waiting zone w for one minute, or where the man m makes a gesture of raising a hand in the waiting zone w for one minute, the man-position/waiting-score calculating unit 5 determines that the man m has a will to cross the road. The action patterns of the gestures used for the above determination are prestored in the man-position/waiting-score storing unit 6.

The thresholds for the above determination are not limited to the above values (such as "three meters", "one minute" as described above, and "five meters", "30 seconds" may be also used.) If one or more men m are determined to have a will to cross the road (Step S12, Yes), the process proceeds to Step S13. If no man is determined to have a will to cross the road (Step S12, No), the process proceeds to Step S14.

Figure 5:
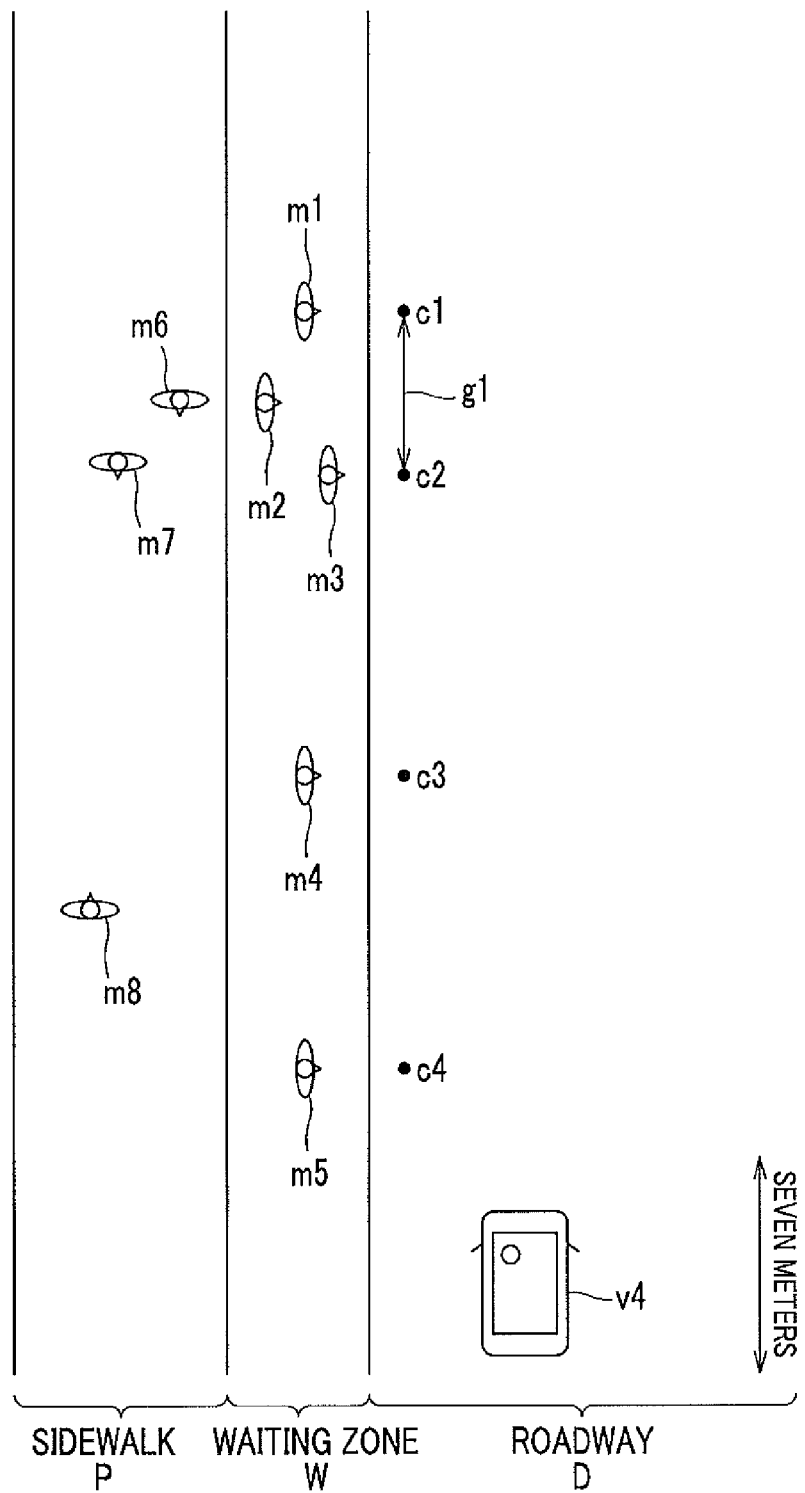
FIG. 5 is a plan view showing how a man-detecting unit in the pedestrian-crossing support system detects men.

When two or more men m are determined to have a will to cross the road, the man-position/waiting-score calculating unit 5 groups the waiting men m (Step S13). This step is for stopping the vehicle v at an appropriate position when multiple men wait for crossing the road. Using the position information regarding the men m detected by the man-detecting unit 2, the man-position/waiting-score calculating unit 5 calculates a distance between any two of the multiple men m. When a distance between the men m is not more than a predetermined distance (which is at least several meters longer than the entire length of the vehicle v), such men m are grouped in a group g, and both end positions of the group g along the roadway d are calculated. For example, when the predetermined distance is set to seven meters and the distance between the men m is not more than seven meters, one group g is made. With reference to FIG. 5, an example will be described.

FIG. 5 is a plan view showing how the man-detecting unit in the pedestrian-crossing support system detects men. In FIG. 5, the man-detecting unit 2 (see FIG. 1) mounted in a subject vehicle v4 detects eight men of a man m1 to a man m8. Five of the men of the man m1 to the man m5 stand still in the waiting zone w for the predetermined time period, and these five men are determined to have a will to cross the road in Step S12. On the other hand, since three of the men of the man m6 to the man m8 are outside of the waiting zone w, these three men are determined to have no will to cross the road in Step S12.

In this case, five of the men of the man m1 to the man m5 who are determined to have a will to cross the road are grouped. In the example of FIG. 5, when a distance between two of the men m is not more than seven meters, such men are grouped in a single group g. The distance between the man m1 and the man m2, and the distance between the man m2 and the man m3 are not more than seven meters, and thus three of the men of the man m1, the man m2, and the man m3 may be grouped in a group g1, for example.

Positions c of the men m at both ends of the group g1 in a travelling direction along the roadway d are calculated. In the example of FIG. 5, both ends of an arrow indicating the group g1, that is, a position c1 of the man m1 and a position c2 of the man m3 in the travelling direction along the roadway d are calculated, respectively. On the other hand, the distance between the man m3 and the man m4, and the distance between the man m4 and the man m5 exceed seven meters, and therefore the man m4 and the man m5 are not grouped. Even when a man belongs to no group g, a position c in the travelling direction along the roadway d is calculated. Thus, a position c3 is calculated for the man m4, and a position c4 is calculated for the man m5.

For example, the distance between the man m3 and the man m6 is not more than seven meters. However, the man m6 is outside of the waiting zone w, and is determined to have no will to cross the road in Step S12. Thus, the man m6 is not grouped in the group g1. If the group g becomes too large, a stopping position for the vehicle v cannot be secured. To tackle this problem, a maximum length for the group g is predetermined, and if the group g becomes larger than this predetermined maximum length, the group g is divided at the position of this maximum length. The maximum length of the group g may be set to 20 m, for example.

Returning to FIG. 4, the man-position/waiting-score calculating unit 5 shares position information regarding the men around the vehicle obtained in Step S13 through inter-vehicle communication (Step S14). In other words, the position information regarding the men around the vehicle is shared with nearby vehicles v using the communicating unit 4. The position c of the group g or the man m, who is determined to have a will to cross the road in Step S12, in the travelling direction along the roadway d is transmitted to nearby vehicles v within the predetermined distance (for example, within 100 m) from the subject vehicle v. At the same time, such position information is received from the nearby vehicles v within the predetermined distance (for example, within 100 m) to the subject vehicle v. The information regarding the subject vehicle v can be complemented using the above position information detected by and received from the nearby vehicles v, even when a man m who the subject vehicle v cannot detect is present around the subject vehicle v.

Since the man-position/waiting-score calculating unit 5 repeatedly executes the procedure of the flowchart shown in FIG. 4 at the predetermined time interval, position information previously detected in a predetermined time period is also shared and used. For example, the position information detected in a time period between the current time and one minute ago may be shared. If the position information detected in the previous predetermined time period is shared and used, the index of waiting time, called herein the waiting score a, obtained in Step S16 in the previous execution loop is also shared and used. A single waiting score a is calculated for each of the men m or the groups g without duplication of the men m and the groups g.

The man-position/waiting-score calculating unit 5 associates the man m with the position c (i.e., the man position) in the travelling direction along the roadway d obtained in Step S14 (Step S15). This association is made for two purposes. The first purpose is to remove duplicated information regarding the same man m when the same man m is detected by multiple vehicles v, or when the same man m previously detected is once again detected. The second purpose is to determine which vehicle v is responsible for the calculation of the index of waiting time, called herein the waiting score a, for each of the men m or the groups g.

To avoid duplication of the same man m, the distance between the positions c of any two of the obtained multiple men m is calculated, and when the calculated distance is not more than a predetermined distance (i.e., deemed as a distance within a position detection error by the man-detecting unit 2), such multiple men m are identified as the same man m. For example, when the distance between the positions c of any two of the multiple men m is not more than 0.5 meter, such multiple men m are identified as the same man m. If the man m is the same as that previously detected, the waiting score a corresponding to the previously detected man m or group g is used in the current execution. If the man m or the group g has not been previously detected, and is detected first in the current execution, the waiting score a is initialized to zero.

The vehicle v that is to be responsible for calculating the waiting score a for each man m or group g is determined. When only one vehicle v is detecting each man m or group g in the current execution, this vehicle v is set to be responsible for calculating the waiting score a. When multiple vehicles v are detecting each man m or group g in the current execution, the nearest vehicle v from the man m or the group g, for example, may be set to be responsible for calculating the waiting score a. When any vehicle v is not detecting each man m or group g in the current execution, the vehicle v1 which was responsible for calculating the waiting score a in the previous execution loop, for example, is once again responsible for the calculation in the current execution. However, the way of determining a vehicle to be responsible for calculating a waiting score a is not limited to the above manner.

The vehicle v responsible for calculating the waiting score a for each man m or group g measures the waiting time of the man m or the group g to cross the road, and thereby calculates the waiting score a (Step S16). For each man m or group g who is determined to have a will to cross the road, that is, who is determined to wait for crossing the road in Step S12, the waiting score a is increased as the waiting time of the man m or the group g increases. In other words, when the man m or the group g is first detected in the current execution, the initial value of the waiting score a is zero. When the same man m or the same group g as that previously detected is detected once again, the waiting score a obtained in the previous execution loop is increased by the amount of the time period for one execution loop.

Figure 6:
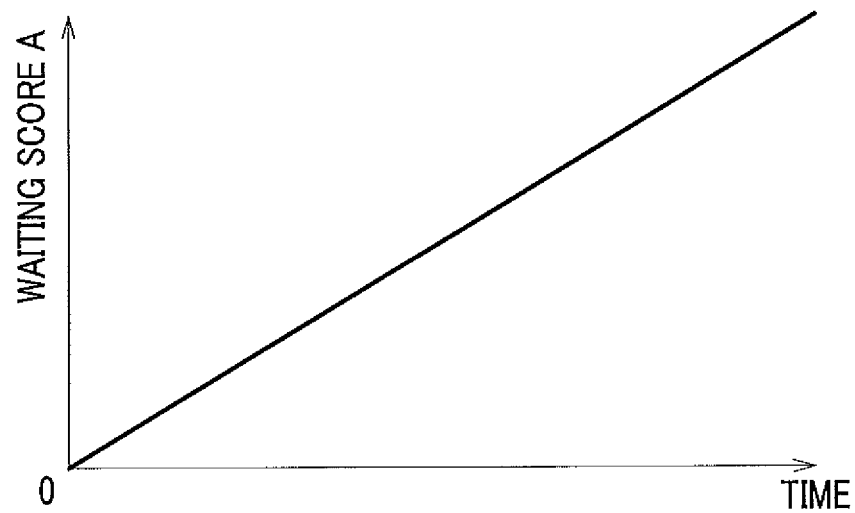
FIG. 6 is a graph showing a relation between a waiting score and a waiting time for a man to cross a road in the pedestrian-crossing support system.

FIG. 6 is a graph showing a relation between a waiting score and a waiting time for a man to cross a road in the pedestrian-crossing support system. The waiting score a may be set to be increased in such a manner that, for example, the waiting score a be proportional to the waiting time as shown in the graph in FIG. 6. The proportional constant (i.e., the inclination of the graph in FIG. 6) may be set to be any value. For example, if the proportional constant is "1" and the unit of time is second, the waiting score a becomes "10" when the waiting time is ten seconds. The proportional constant may be varied according to the number of the men m belonging to the group g.

Figure 7:
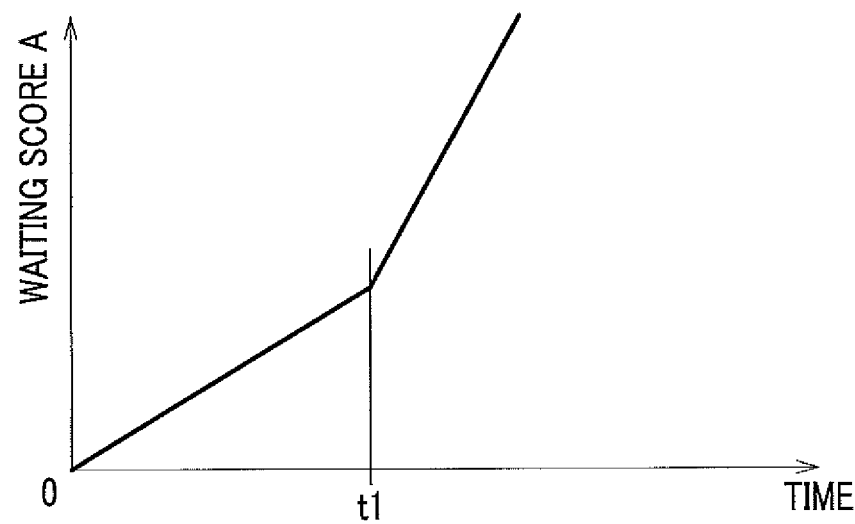
FIG. 7 is a graph showing a relation between a waiting score and a waiting time for a man to cross a road in the pedestrian-crossing support system.

FIG. 7 is a graph showing a relation between a waiting score and a waiting time for a man to cross a road in the pedestrian-crossing support system. For example, as shown in the graph of FIG. 7, in the case where at first, a man m waited, and one more man came and waited at time t1 so that these two men are grouped in a group g, the proportional constant after the time t1 may be set as twice that before the time t1. This reduces waiting time before the vehicle v stops by increasing the waiting score a at a rapid pace when many men m are waiting for crossing the road.

Returning to FIG. 4, in case that no vehicle v has detected each man m or each group g for a long time, the man-position/waiting-score calculating unit 5 determines whether or not such non-detection time period exceeds a predetermined value called herein a reset threshold y (Step S17).

The man-position/waiting-score calculating unit 5 continues to calculate the waiting score a even in a non-detection time period for the man m or the group g detected in a past predetermined time period. However, when the man m or the group g has not been detected for a long time, the man m or the group g may not be still waiting at the position where the man m or the group g was detected at the last time period.

Non-detection of the man m or the group g means that no vehicle v may be present in an area where the man m or the group g can be detected. In other words, when neither the man m nor the group g has been detected for a long time, no vehicle v is travelling around, and it is highly possible that the man m or the group g has already crossed the road.

Accordingly, when neither the man m nor the group g has been detected for a long time, the man-position/waiting-score calculating unit 5 determines that the man m or the group g has already crossed the road. For this determination, the man-position/waiting-score calculating unit 5 measures the non-detection time period for each man m or each group g since the last time when the man m or the group g was detected. The man-position/waiting-score calculating unit 5 then determines whether or not the non-detection time period exceeds the predetermined reset threshold y. If the non-detection time period does not exceed the threshold (Step S17, No), the process proceeds to Step S19.

If the non-detection time period exceeds the reset threshold y (Step S17, Yes), the position corresponding to the man m or the group g is canceled (Step S18). In other words, the man-position/waiting-score calculating unit 5 determines that the man m or the group g corresponding to the non-detection time period which exceeds the reset threshold y has already crossed the road, and the corresponding position c and waiting score a are canceled.

In the last step, the man-position/waiting-score calculating unit 5 shares the waiting score a with the nearby vehicles v through inter-vehicle communication using the communicating unit 4 (Step S19). In other words, the position c and the waiting score a of each man m or each group g are shared with vehicles v in the predetermined distance (for example, within 100 m), and stored in the man-position/waiting-score storing unit 6 thereof. The procedure of the man-position/waiting-score calculating unit 5 has been described with reference to the flowchart of FIG. 4.

Figure 8:
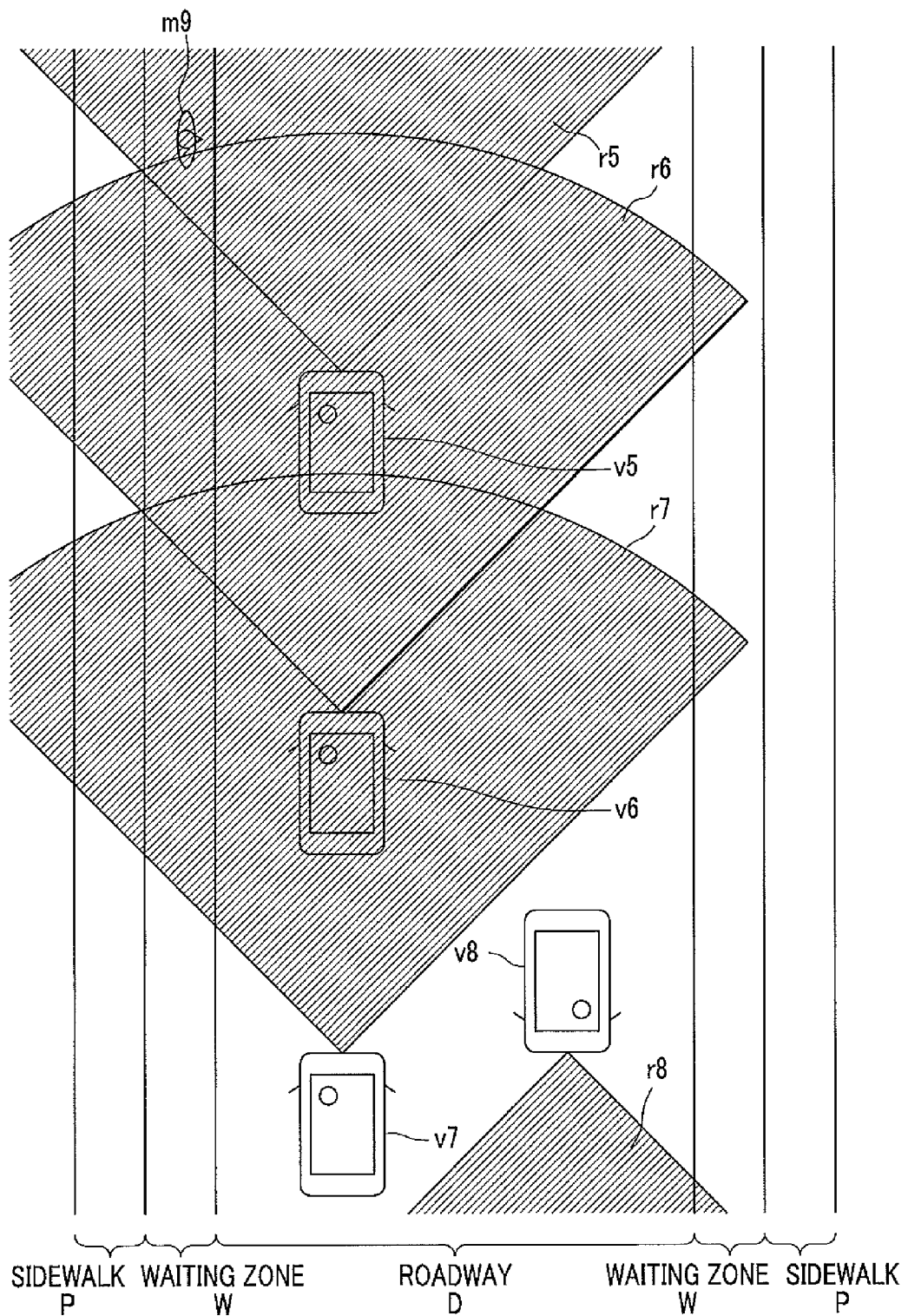
FIG. 8 is a plan view showing a situation in which vehicles having the pedestrian-crossing support system travel.
Figure 9:
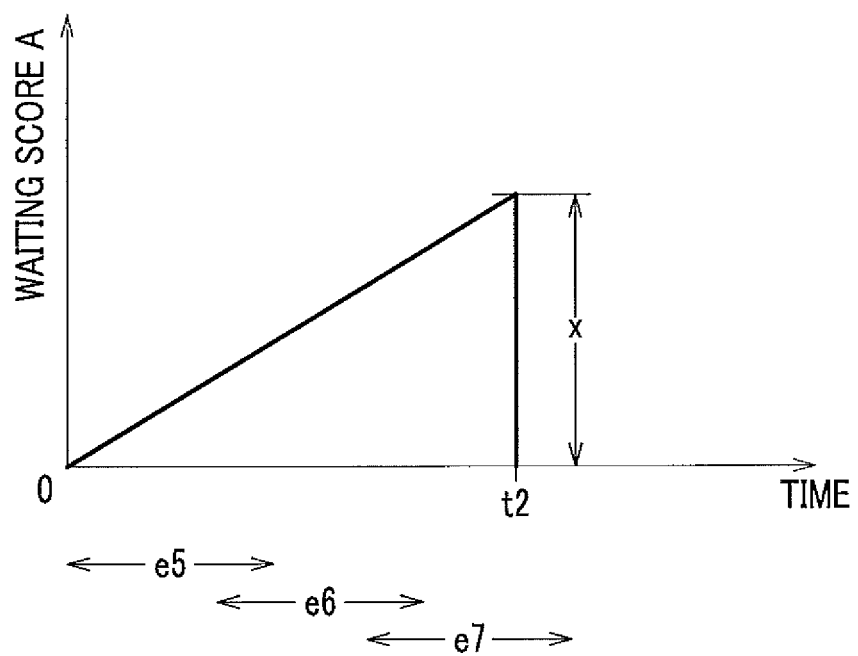
FIG. 9 is a graph showing a relation between a waiting score and a waiting time for a man to cross a road in the pedestrian-crossing support system.
Figure 10:
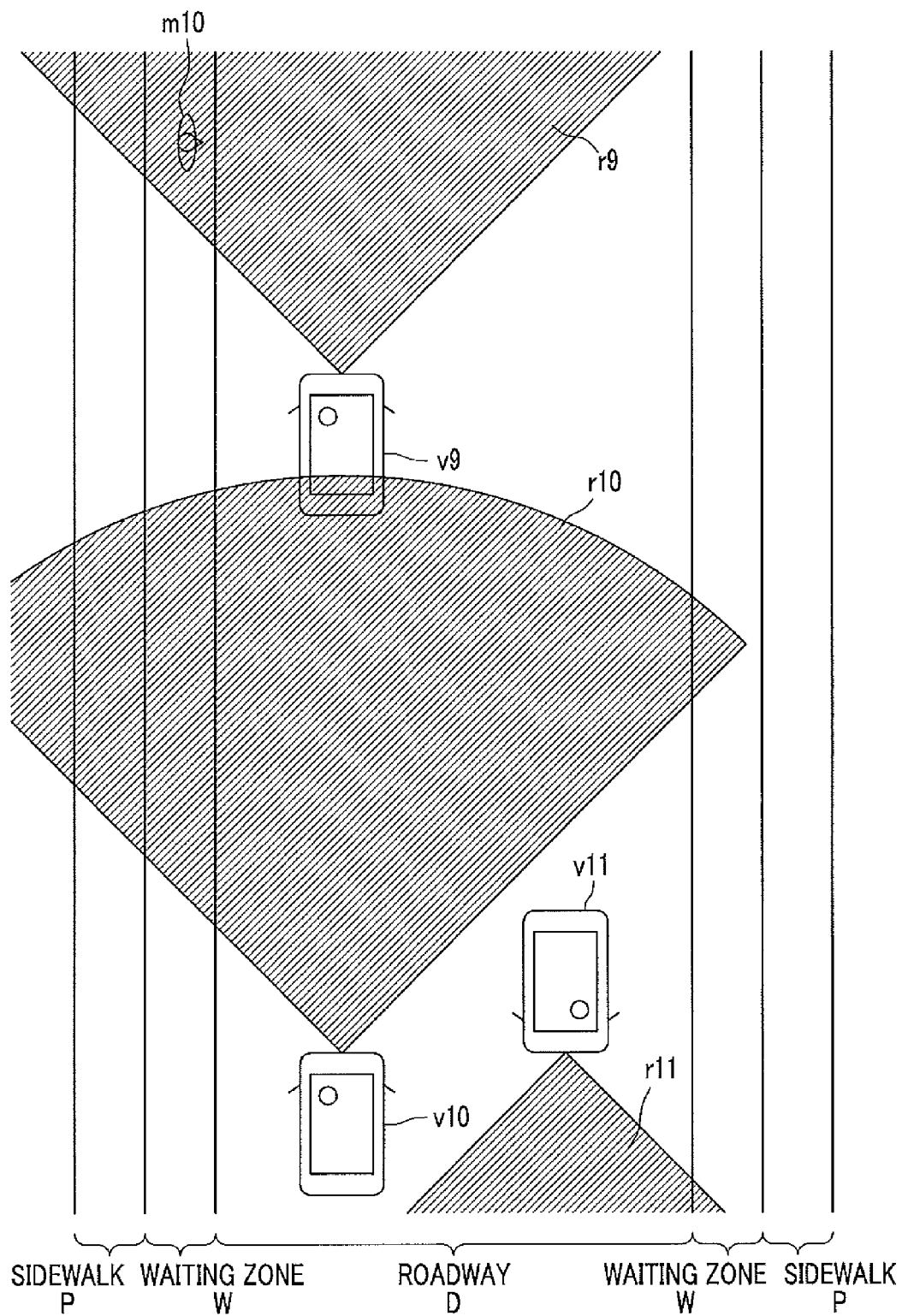
FIG. 10 is a plan view showing a situation in which vehicles having the pedestrian-crossing support system travel.
Figure 11:
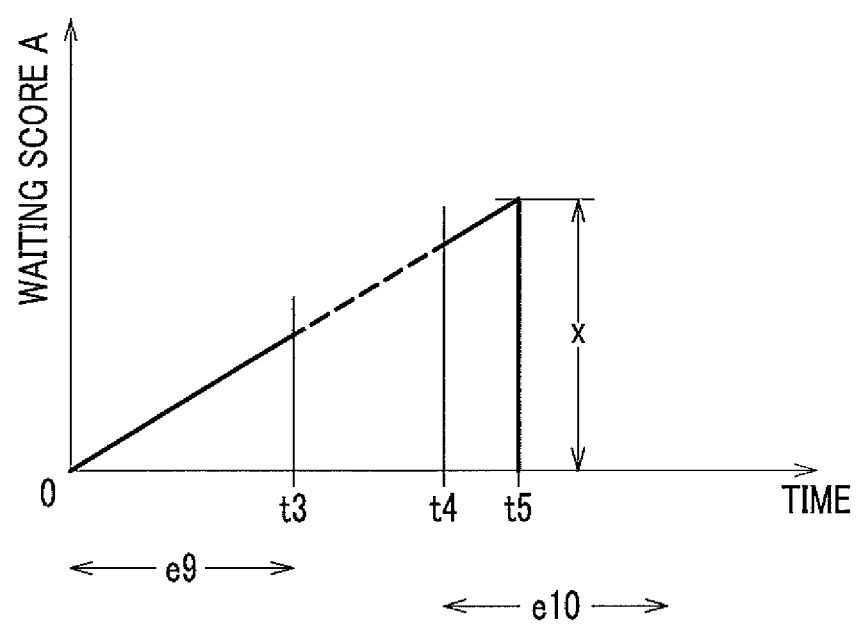
FIG. 11 is a graph showing a relation between a waiting score and a waiting time for a man to cross a road in the pedestrian-crossing support system.
Figure 12:
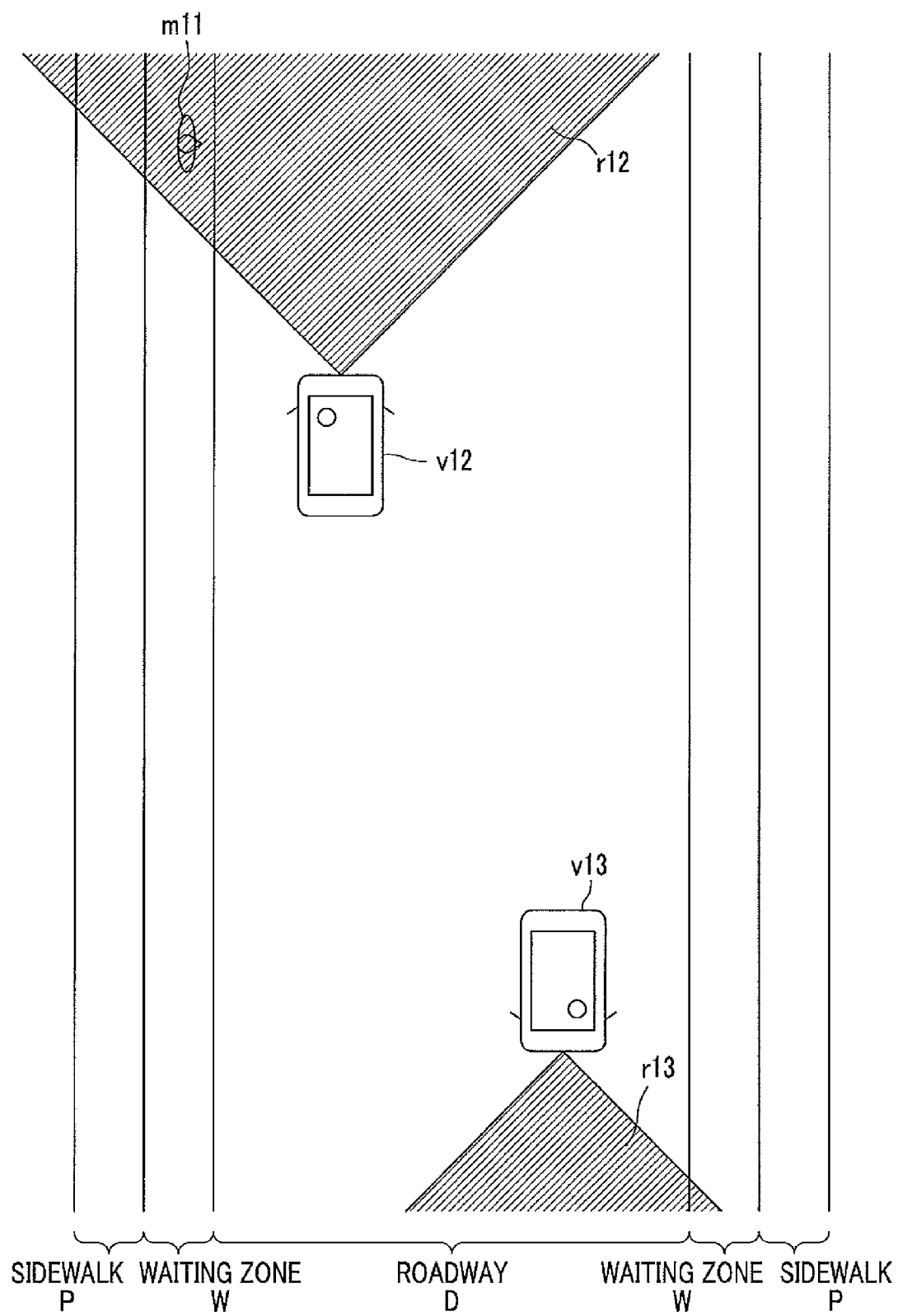
FIG. 12 is a plan view showing a situation in which vehicles having the pedestrian-crossing support system travel.
Figure 13:
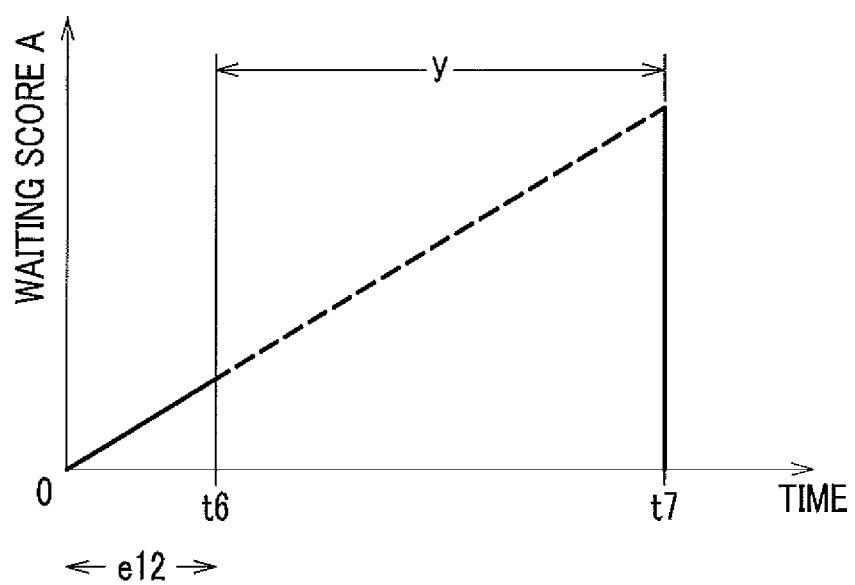
FIG. 13 is a graph showing a relation between a waiting score and a waiting time for a man to cross a road in the pedestrian-crossing support system.

With reference to FIG. 8 to FIG. 13, an example of the procedure of the man-position/waiting-score calculating unit 5 will be described hereinafter. Each of FIG. 8, FIG. 10, and FIG. 12 is a plan view showing a different situation in which the vehicles having the pedestrian-crossing support system 1 travel. FIG. 9, FIG. 11, and FIG. 13 are respective graphs, each showing a relation between a waiting score and a waiting time for a man m or a group g to cross a road. The graph of FIG. 9 corresponds to the situation shown in FIG. 8, the graph of FIG. 11 corresponds to the situation shown in FIG. 10, and the graph of FIG. 13 corresponds to the situation shown in FIG. 12.

FIG. 8 is a plan view showing a different situation in which the vehicles having the pedestrian-crossing support system travel. FIG. 8 shows four of the vehicles v of a vehicle v5 to a vehicle v8 travelling. A man-detecting unit 2a to a man-detecting unit 2d are mounted in the vehicle v5 to the vehicle v8, respectively. Each man-detecting unit has a detection range r thereof, which is shown as a detection range r5 to a detection range r8 having a fan shape shown in hatch pattern. The vehicle v5, the vehicle v6, and the vehicle v7 are travelling in the same lane, and the detection range r5 of the man-detecting unit 2a mounted in the vehicle v5, the detection range r6 of the man-detecting unit 2b mounted in the vehicle v6, and the detection range r7 of the man-detecting unit 2c mounted in the vehicle v7 overlap in the waiting zone w, and no gap exists between the detection ranges, so that any one of the vehicles v detects a man m9 in the waiting zone w.

FIG. 9 is a graph showing a relation between a waiting score and a waiting time for a man to cross a road in the pedestrian-crossing support system. In the graph shown in FIG. 9, which shows a relation between a waiting score a and a waiting time in the situation of FIG. 8, a time period in which the vehicle v5 detects the man m9 is shown as an arrow e5, a time period in which the vehicle v6 detects the man m9 is shown as an arrow e6, and a time period in which the vehicle v7 detects the man m9 is shown as an arrow e7. The arrow e5 and the arrow e6 overlap in a part, and the arrow e6 and the arrow e7 overlap in a part. In every time period, any one of the vehicle v5, the vehicle v6, and the vehicle v7 is responsible for calculating the waiting score a of the man m9.

The man-position/waiting-score calculating unit 5 of the responsible vehicle consistently detects the man m9 and calculates the waiting score a. At time t2, the waiting score a of the man m9 exceeds the stopping-vehicle threshold x. Thus, if it is possible for the vehicle v7 travelling before the man m9 at the time t2 to safely stop before the man m9, then the vehicle v7 stops. Then, the man-position/waiting-score calculating unit 5 cancels the waiting score a of the man m9 (Step S18 in FIG. 4). The procedure of stopping the vehicle will be described in detail below.

FIG. 10 is a plan view showing a different situation in which the vehicles having the pedestrian-crossing support system travel. FIG. 10 shows three of the vehicles v of a vehicle v9 to a vehicle v11 travelling. A man-detecting unit 2e to a man-detecting unit 2g are mounted in the vehicle v9 to the vehicle v11, respectively. Each man-detecting unit has a detection range r thereof, which is shown as a detection range r9 to a detection range r11 having a fan shape shown in hatch pattern. The vehicle v9 and the vehicle v10 are travelling in the same lane, and the detection range r9 of the man-detecting unit 2e mounted in the vehicle v9 and the detection range r10 of the man-detecting unit 2f mounted in the vehicle v10 do not overlap in the waiting zone w. A man m10 in the waiting zone w can be detected in some time periods, and cannot be detected in other time periods.

FIG. 11 is a graph showing a relation between a waiting score and a waiting time for a man to cross a road in the pedestrian-crossing support system. In the graph shown in FIG. 11, which shows a relation between a waiting score a and a waiting time in the situation of FIG. 10, a time period in which the vehicle v9 detects the man m10 is shown as an arrow e9, and a time period in which the vehicle v10 detects the man m10 is shown as an arrow e10. The arrow e9 and the arrow e10 do not overlap, which indicates that the man m10 in the waiting zone w cannot be detected during time t3 to time t4. However, even during the time when the man m10 cannot be detected, the procedure of the man-position/waiting-score calculating unit 5 shown in FIG. 4 as described above calculates the waiting score a. At time t5, the waiting score a of the man m10 exceeds the stopping-vehicle threshold x. Thus, the vehicle v10 which is travelling before the man m10 at the time t5 stops if the vehicle v10 can safely stop before the man m10. Then, the man-position/waiting-score calculating unit 5 cancels the waiting score a of the man m10. The procedure of stopping the vehicle will be described in detail below.

FIG. 12 is a plan view showing a different situation in which the vehicles having the pedestrian-crossing support system travel. FIG. 12 shows two of the vehicles v of a vehicle v12 and a vehicle v13 travelling. A man-detecting unit 2h and a man-detecting unit 2i are mounted in the vehicle v12 and the vehicle v13, respectively. Each man-detecting unit has a detection range r thereof, which is shown as a detection range r12 or a detection range r13 having a fan shape shown in hatch pattern. A vehicle v which can detect a man m11 in the waiting zone w is only the vehicle v12, and the man m11 cannot be detected for a long time.

FIG. 13 is a graph showing a relation between a waiting score and a waiting time for a man to cross a road in the pedestrian-crossing support system. An arrow in FIG. 13 denotes a time period. In the graph shown in FIG. 13, which shows a relation between a waiting score a and a waiting time in the situation of FIG. 12, a time period in which the vehicle v12 detects the man m11 is shown as an arrow e12. After time t6, the man m11 in the waiting zone w cannot be detected. The man-position/waiting-score calculating unit 5 calculates the waiting score a even during the time when the man m11 cannot be detected. At time t7, the non-detection time period for the man m11 exceeds the reset threshold y. Thus, the man-position/waiting-score calculating unit 5 determines that the man m11 corresponding to the non-detection time period which exceeds the reset threshold y has already crossed the road, and cancels the waiting score a of the man m11.

That is, when a man once detected by the man-detecting unit 2 has not been detected for the predetermined time period, the man-position/waiting-score calculating unit 5 may reset the waiting score of the man.

The procedure of the stopping-vehicle determining unit 10 will be described hereinafter.

Figure 14:
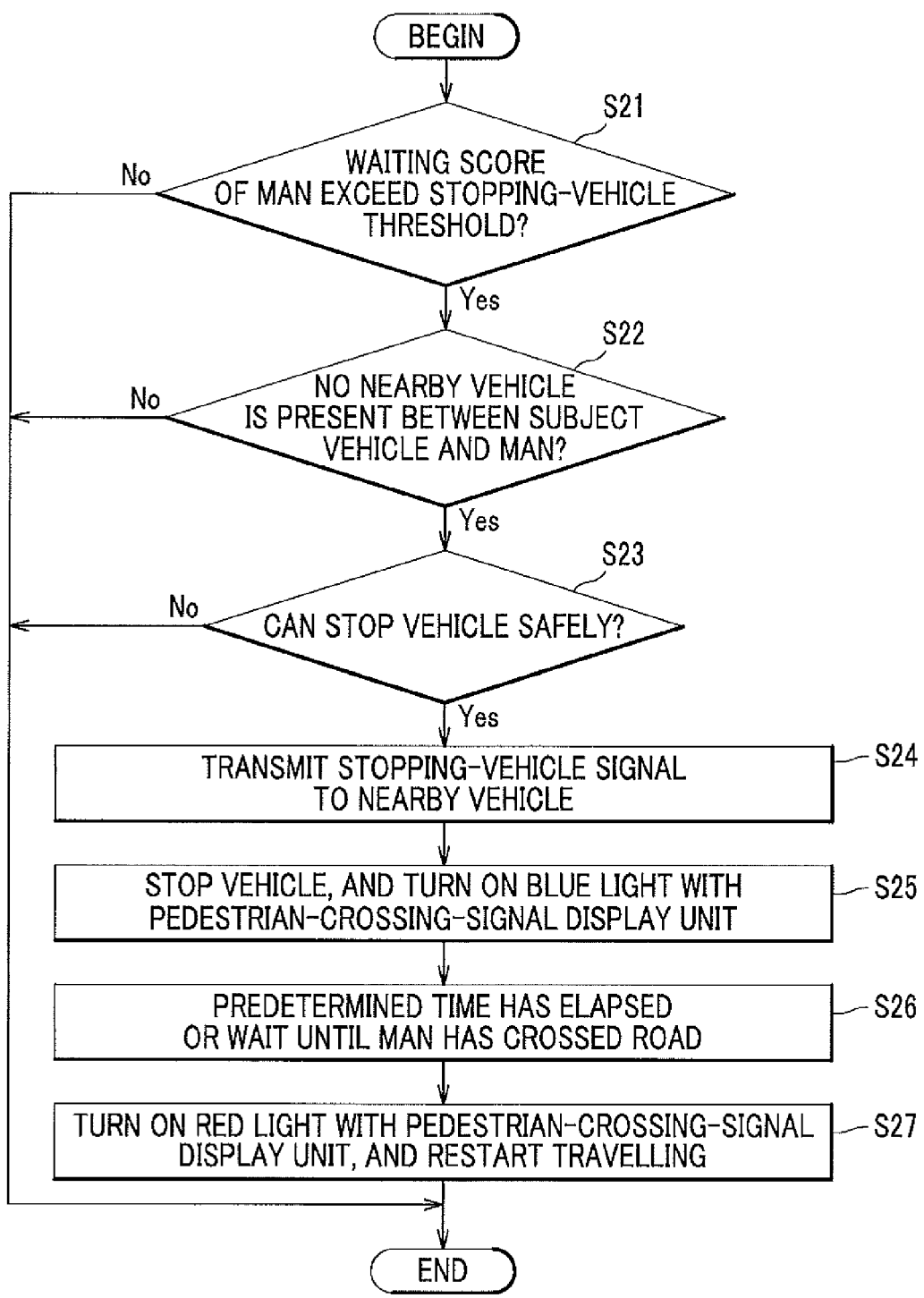
FIG. 14 is a flowchart showing a procedure of a stopping-vehicle determining unit in the pedestrian-crossing support system.

FIG. 14 is a flowchart showing the procedure of a stopping-vehicle determining unit in the pedestrian-crossing support system. The procedure of the flowchart shown in FIG. 14 is performed for each man m or each group g stored in the man-position/waiting-score storing unit 6. When a vehicle v which performs the procedure of the stopping-vehicle determining unit 10 is travelling, red light is turned on with the pedestrian-crossing-signal display unit 13 to inform a man m that crossing the road is unsafe.

First, the stopping-vehicle determining unit 10 obtains a waiting score a of a man m or a group g from the man-position/waiting-score storing unit 6, and determines whether or not the waiting score a exceeds the stopping-vehicle threshold x (Step S21). If the waiting score a exceeds the stopping-vehicle threshold x (Step S21, Yes), the process proceeds to Step S22. Otherwise, if the waiting score a does not exceed the stopping-vehicle threshold x (Step S21, No), the process of the flowchart shown in FIG. 14 is ended, and another process of the flowchart shown in FIG. 14 is started for a man m or a group g detected next by the man-detecting unit 2.

Then, the stopping-vehicle determining unit 10 determines whether or not a nearby vehicle v is present in the travelling lane of the subject vehicle between the subject vehicle v having the stopping-vehicle determining unit 10 and the obtained man m or group g (Step S22). This step is for, when multiple vehicles v are travelling around the vehicle v, stopping the vehicle v at an appropriate position to enable the man m or the group g to safely cross the road. In other words, when a nearby vehicle v is present in the travelling lane of the subject vehicle between the subject vehicle v and the man m or the group g, the subject vehicle v should be stopped with securing a space so that the nearby vehicle v can stop before the man m or the group g.

According to the embodiment, to achieve this operation, each of the vehicles v determines its stopping position h successively from the nearest to the farthest vehicle to the man m or the group g. The subject vehicle v obtains positions of nearby vehicles from the nearby-vehicle-position storing unit 7, and determines whether or not any nearby vehicle v is present in the travelling lane of the subject vehicle between the subject vehicle v and the man m or the group g. If any nearby vehicle v is present in the travelling lane of the subject vehicle between the subject vehicle v and the man m or the group g (Step S22, No), the process of the flowchart shown in FIG. 14 is ended, and the stopping-vehicle analyzing unit 11 determines a stopping position h according to the procedure of the flowchart shown in FIG. 15 as described below.

If no nearby vehicle v is present in the travelling lane of the subject vehicle between the subject vehicle v and the man m or the group g (Step S22, Yes), the stopping-vehicle determining unit 10 determines whether or not the subject vehicle v can safely stop (Step S23). In Step S23, specifically, the stopping-vehicle determining unit 10 obtains the position information regarding the man m or the group g from the man-position/waiting-score storing unit 6, the position information regarding the subject vehicle v from the subject-vehicle-position storing unit 8, and the road map around the subject vehicle v from the road-map storing unit 9. The stopping-vehicle determining unit 10 determines whether or not the subject vehicle v can stop in a predetermined range of deceleration with which the subject vehicle v can safely stop, before the man m or the group g, and outside of a no-stopping zone such as an intersection.

If the stopping-vehicle determining unit 10 determines that the subject vehicle cannot safely stop (Step S23, No), the process of the flowchart shown in FIG. 14 is ended, and the subject vehicle v passes without stopping before the man m or the group g.

If it is determined that the vehicle can safely stop, and the stopping position h is determined (Step S23, Yes), the stopping-vehicle determining unit 10 transmits a stopping-vehicle signal to nearby vehicles v around the subject vehicle (Step S24). In other words, the stopping position h of the subject vehicle v is transmitted to the nearby vehicles v within the predetermined distance (for example, within 100 m) from the subject vehicle v using the communicating unit 4. Each nearby vehicle v receives the stopping position h of the subject vehicle v, and the stopping-vehicle-signal analyzing unit 11a mounted in the nearby vehicle v determines a stopping position h of the nearby vehicle v so as not to crash into the subject vehicle v according to the procedure of the flowchart shown in FIG. 15 as described below.

The subject vehicle v stops at the stopping position h, and turns on blue light with the pedestrian-crossing-signal display unit 13 (Step S25). Specifically, the stopping-vehicle determining unit 10 instructs the travelling controller 12 to stop the vehicle, and thereby the subject vehicle v is stopped at the stopping position h. At the same time, when the stopping-vehicle determining unit 10 sends the instruction of stopping the vehicle, and the travelling controller 12 stops the subject vehicle v, the stopping-vehicle determining unit 10 determines that the man m can safely cross the road, and turns on blue light with the pedestrian-crossing-signal display unit 13 to inform the man m to safely cross the road (In Step S25, no nearby vehicle v is present in the travelling lane of the subject vehicle between the subject vehicle v and the man m or the group g.) To check if the vehicle stops, the stopping-vehicle determining unit 10 may use a signal received from the travelling controller 12, or the stopping position of the subject-vehicle-position storing unit 8.

Then, the stopping-vehicle determining unit 10 waits until a predetermined time period has elapsed, or the man has crossed the road (Step S26). Specifically, the subject vehicle v stops, turns on blue light with the pedestrian-crossing-signal display unit 13, and then in, at least, either case where the predetermined time period has elapsed, or where the man m has crossed the road, turns on blue flashing light with the pedestrian-crossing-signal display unit 13 to restart travelling of the subject vehicle v, and thereby the man m is informed that the subject vehicle v will start travelling in a predetermined time period.

In Step S26, the stopping-vehicle determining unit 10 determines whether or not the man m has crossed the road using the absolute position of the man m calculated by the man-position/waiting-score calculating unit 5 and the map information stored in the road-map storing unit 9. Specifically, the man-position/waiting-score calculating unit 5 calculates the absolute position of the man m using the relative position of the man m detected by the man-detecting unit 2 and the absolute position of the subject vehicle v detected by the subject-vehicle-position detecting unit 3. When the position of the man m is on the roadway, a "crossing" state is determined. When the position of the man m is on the sidewalk or in the waiting zone for crossing the road, a "crossed" state is determined. That is, when the "crossing" state is determined to be turned to the "crossed" state, the man m is determined to have crossed the road.

As described above, the road map stored in the road-map storing unit 11 can be represented in two ways: a map representation using absolute coordinates to define positions of the sidewalk and the waiting zone; and a map representation using a relative distance from a road shoulder, in which, for example, the waiting zone may be defined at a position with a distance of a predetermined meter from the road shoulder, and the sidewalk may be defined at a position with a distance of a predetermined meter from the road shoulder. When the absolute map representation is used, the stopping-vehicle determining unit 10 determines whether or not the absolute position of the man m is on the sidewalk or in the waiting zone in the map. When the relative map representation is used, the map is referred with the absolute position of the man m, and the predetermined meter, with which the sidewalk/the waiting zone is defined from the road shoulder, at the absolute position of the man m is obtained. Then, it is determined whether or not the man is on the sidewalk or in the waiting zone by relatively comparing the position of the man m with the position of the road shoulder detected according to a known technique disclosed in, for example, Japanese Patent Laid-Open No. H6-266828 entitled "Vehicle Exterior Monitoring System for Vehicle", the entire contents of which are hereby incorporated by reference.

After blue flashing light is turned on with the pedestrian-crossing-signal display unit 13, and the predetermined time period has elapsed, the stopping-vehicle determining unit 10 turns on red light with the pedestrian-crossing-signal display unit, and restarts the travelling of the subject vehicle v (Step S27). When the travelling of the vehicle is restarted, the stopping-vehicle determining unit 10 instructs the pedestrian-crossing-signal display unit 13 to turn on red light while the subject vehicle v is travelling, and informs the man m that crossing the road is unsafe, as described above. The procedure of the stopping-vehicle determining unit 10 has been described with reference to the flowchart shown in FIG. 14.

The procedure of the stopping-vehicle-signal analyzing unit 11 will be described hereinafter.

Figure 15:
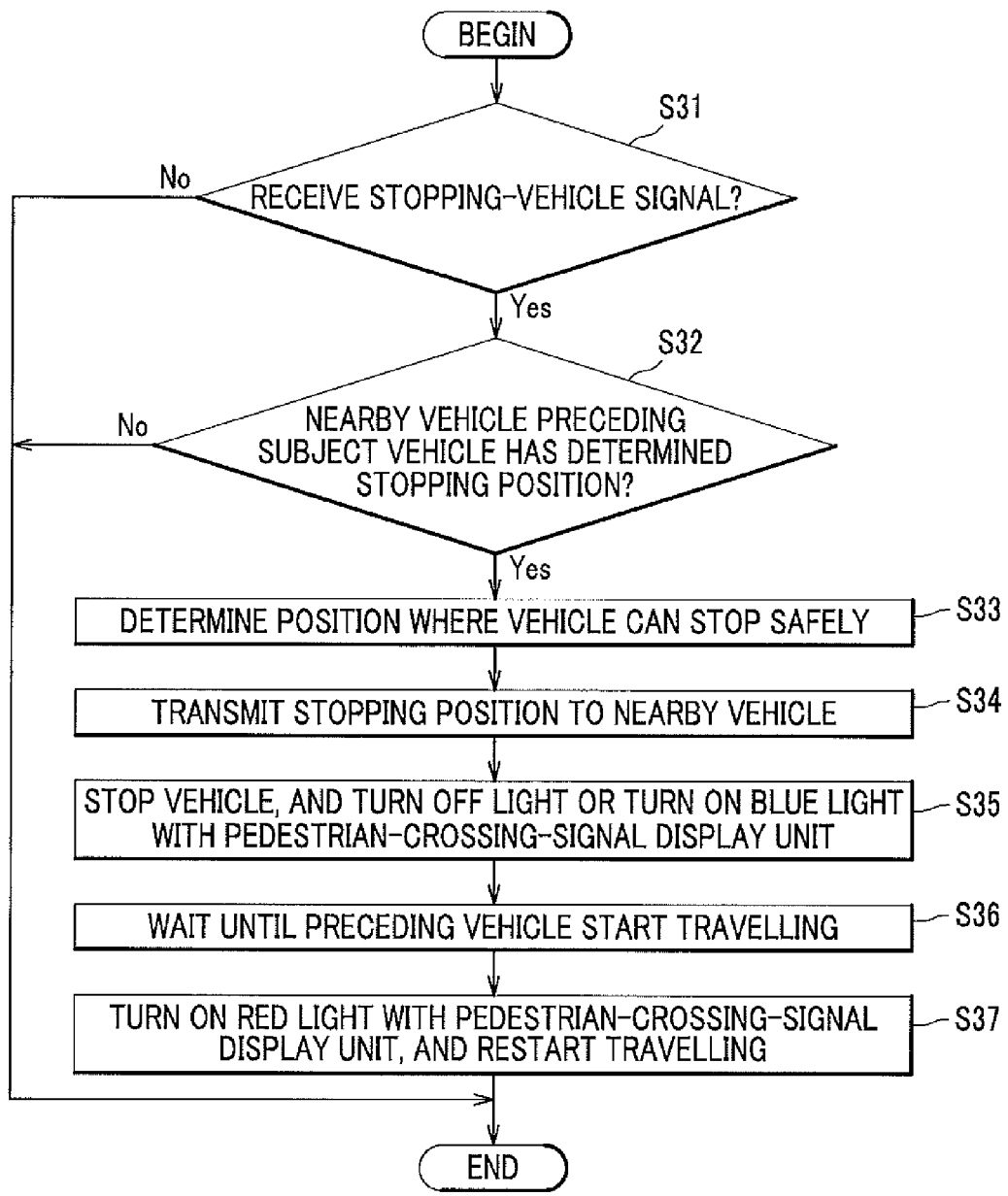
FIG. 15 is a flowchart showing a procedure of a stopping-vehicle-signal analyzing unit in the pedestrian-crossing support system.

FIG. 15 is a flowchart showing the procedure of the stopping-vehicle-signal analyzing unit in the pedestrian-crossing support system. Similar to the stopping-vehicle determining unit 10, when the vehicle v which performs the procedure of the stopping-vehicle-signal analyzing unit 11 is travelling, red light is turned on with the pedestrian-crossing-signal display unit 13 to inform the man m that crossing the road is unsafe.

First, the stopping-vehicle-signal analyzing unit 11 determines whether or not a stopping-vehicle signal is received (Step S31). Specifically, a stopping position h of a nearby vehicle v within the predetermined distance (for example, within 100 m) from the subject vehicle v is received using the communicating unit 4. This stopping position h of the nearby vehicle v is the position transmitted in Step S24 of the procedure of the stopping-vehicle determining unit 10 shown in FIG. 14. If the stopping position h of the nearby vehicle v is received (Step S31, Yes), the process proceeds to Step S32. Otherwise, if no stopping position h of the nearby vehicle v is received (Step S31, No), the process of the flowchart shown in FIG. 15 is ended.

Then, using the communicating unit 4, the stopping-vehicle-signal analyzing unit 11 determines whether or not the stopping position h of the nearby vehicle v preceding the subject vehicle v, that is, the nearby vehicle v present in the travelling lane of the subject vehicle between the subject vehicle v and the man m or the group g, is already determined (Step S32). This step is for determining the stopping position h successively from the nearest to the farthest vehicle to the man m or the group g, similar to Step S22. If the stopping position h of the nearby vehicle v present in the travelling lane of the subject vehicle between the subject vehicle v and the man m or the group g is not determined (Step S32, No), the process of the flowchart shown in FIG. 15 is ended, and again, the procedure of the flowchart shown in FIG. 15 is repeatedly performed until the stopping position h of the nearby vehicle v, which is present in the travelling lane of the subject vehicle between the subject vehicle v and the man m or the group g, is determined and transmitted to the subject vehicle v.

If the stopping position h of the nearby vehicle v, which is in the travelling lane of the subject vehicle between the subject vehicle v and the man m or the group g, is determined (Step S32, Yes), the stopping-vehicle-signal analyzing unit 11 determines a stopping position h where the subject vehicle v can safely stop (Step S33). In other words, since the stopping position h of the nearby vehicle v, which is present in the travelling lane of the subject vehicle between the subject vehicle v and the man m or the group g, is determined, the stopping position h of the subject vehicle v following the nearby vehicle v is determined. Specifically, the stopping-vehicle-signal analyzing unit 11 obtains the position of the man m or the group g from the man-position/waiting-score storing unit 6, the position of the subject vehicle v from the subject-vehicle-position storing unit 8, and the road map around the subject vehicle v from the road-map storing unit 9, and determines the stopping position h of the subject vehicle v, which is behind the stopping position h of the nearby vehicle v obtained in Step S32 and outside of the no-stopping zone such as an intersection.

When no nearby vehicle v is present in the travelling lane of the subject vehicle between the subject vehicle v and the man m or the group g, but a nearby vehicle v is present only in the opposite lane of the subject vehicle v, the stopping position h of the subject vehicle v is determined so that the subject vehicle v can safely stop in a predetermined range of deceleration, before the man m or the group g, and outside of the no-stopping zone such as an intersection.

After determining the stopping position h of the subject vehicle v, the stopping-vehicle-signal analyzing unit 11 uses the communicating unit 4 to transmit the stopping position h of the subject vehicle v to the nearby vehicles v within the predetermined distance (for example, within 100 m) from the subject vehicle v (i.e., the nearby vehicles v around the subject vehicle v) (Step S34). Each nearby vehicle v receives the stopping position h of the subject vehicle v, and the stopping-vehicle-signal analyzing unit 11a mounted in the nearby vehicle v determines its stopping position h so as not to crash into the subject vehicle v according to the procedure of the flowchart shown in FIG. 15, successively from the nearest to the farthest vehicle v to the man m or the group g.

Then, the stopping-vehicle-signal analyzing unit 11 stops the subject vehicle v at the stopping position h. The stopping-vehicle-signal analyzing unit 11 instructs the travelling controller 12 to stop the vehicle, and thereby the subject vehicle v is stopped at the stopping position h. At the same time, in the case where the stopping-vehicle-signal analyzing unit 11 sends the instruction of stopping the vehicle and the travelling controller 12 stops the subject vehicle v, and where a nearby vehicle v is present in the travelling lane of the subject vehicle between the subject vehicle v and the man m or the group g, the subject vehicle v turns off light with the pedestrian-crossing-signal display unit 13 in case that a nearby vehicle v travels in the opposite lane at the stopping position h of the subject vehicle v (Step S35).

Otherwise, that is, in the case where the stopping-vehicle-signal analyzing unit 11 sends the instruction of stopping the vehicle and the travelling controller 12 stops the subject vehicle v, and where no nearby vehicle v is present in the travelling lane of the subject vehicle between the subject vehicle v and the man m or the group g, the stopping-vehicle-signal analyzing unit 11 determines that the man m can safely cross the road, and turns on blue light with the pedestrian-crossing-signal display unit 13 to inform the man m that the man m can safely cross the road.

The subject vehicle v stops, and turns off light or turns on blue light with the pedestrian-crossing-signal display unit 13, and then the stopping-vehicle-signal analyzing unit 11 waits until the nearby vehicle v which stops in front of the subject vehicle v (i.e., the preceding vehicle) starts travelling (Step S36). When no nearby vehicle v is present in the travelling lane of the subject vehicle between the subject vehicle v and the man m or the group g (i.e., when the subject vehicle turns on blue light with the pedestrian-crossing-signal display unit 13), the stopping-vehicle-signal analyzing unit 11 waits until the nearby vehicle v which stops before the man m or the group g in the opposite lane starts travelling. Also, in the case where no nearby vehicle v is present in the travelling lane of the subject vehicle between the subject vehicle v and the man m or the group g, and when the nearby vehicle v, which stops before the man m or the group g in the opposite lane, turns on blue flashing light with the pedestrian-crossing-signal display unit 13 to restart travelling (Step S26), the subject vehicle v turns on blue flashing light with the pedestrian-crossing-signal display unit 13 at the same time to inform the man m that the subject vehicle v will start travelling in the predetermined time period.

Then, when the nearby vehicle v in front of the subject vehicle v starts travelling, the stopping-vehicle-signal analyzing unit 11 of the subject vehicle v turns on red light with the pedestrian-crossing-signal display unit 13, and restarts the travelling of the subject vehicle v (Step S37). When no nearby vehicle v is present in the travelling lane of the subject vehicle between the subject vehicle v and the man m or the group g (i.e., when the subject vehicle v turns on blue light with the pedestrian-crossing-signal display unit 13), and the nearby vehicle v, which stops before the man m or the group g in the opposite lane, starts travelling, the subject vehicle v restarts travelling. As described above, when the subject vehicle v is travelling, red light is turned on with the pedestrian-crossing-signal display unit 13 to inform the man m that crossing the road is unsafe. The procedure of the stopping-vehicle-signal analyzing unit 11 has been described with reference to the flowchart shown in FIG. 15. As described above, the operations of the vehicle v having the pedestrian-crossing support system 1 shown in FIG. 3 can be achieved in the above embodiment.

<Modification>

Figure 16:
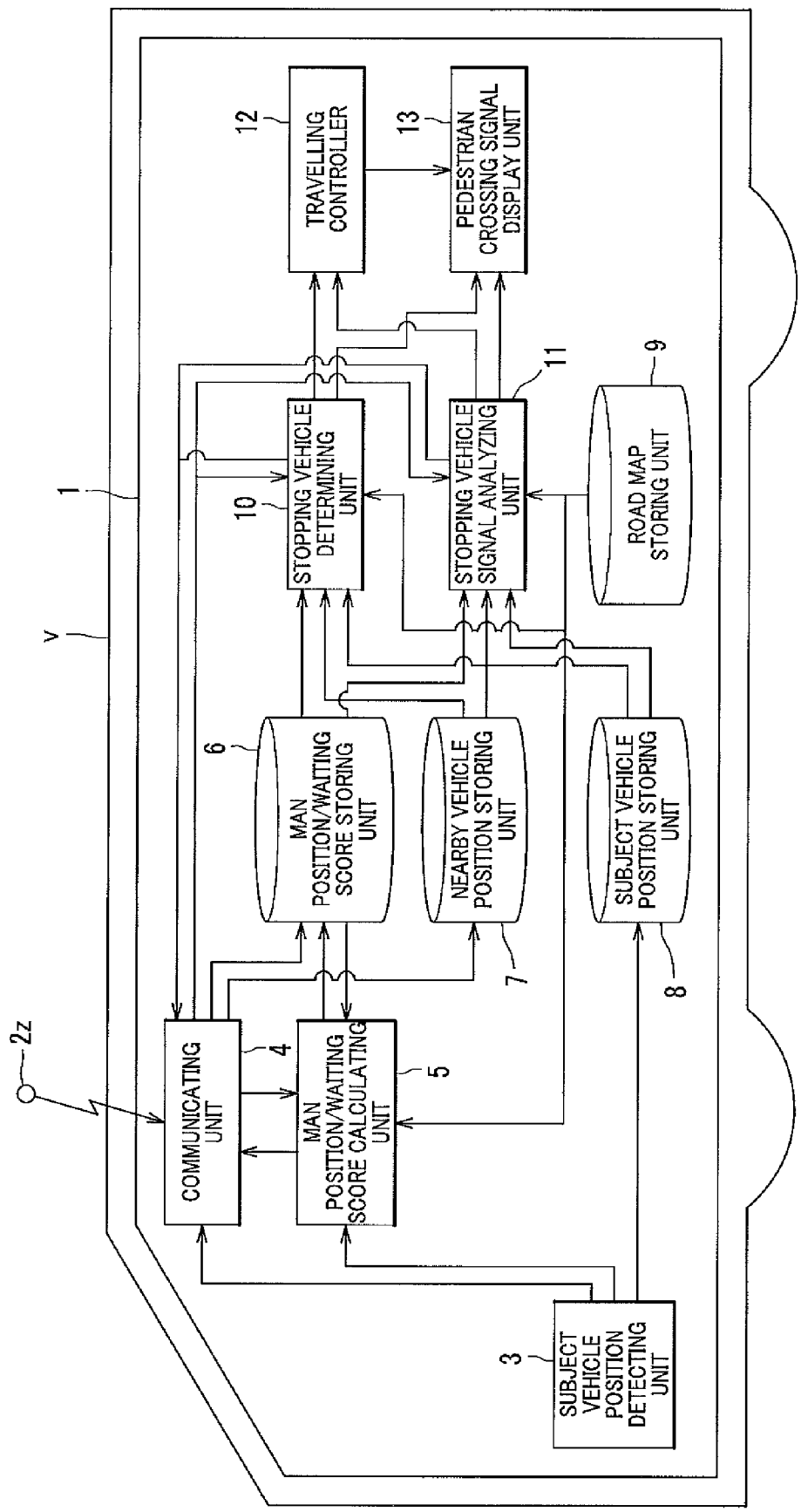
FIG. 16 is a block diagram showing a configuration of a modification of the pedestrian-crossing support system.

FIG. 16 is a block diagram showing a configuration of a modification of the pedestrian-crossing support system. A configuration of the modification of the pedestrian-crossing support system 1 as an embodiment of the present invention will be described with reference to FIG. 16. In the modification, the pedestrian-crossing support system 1 is also mounted in a vehicle v, such as an autonomous vehicle or a passenger automobile, and supports a man m, such as a pedestrian or a bicyclist, in safely crossing a road on which the vehicle v travels. The configuration of the modification of the pedestrian-crossing support system 1 is similar to that of the pedestrian-crossing support system 1 described above, but has a difference in that the man-detecting unit 2 is not mounted in the vehicle v. Instead of the man-detecting unit 2, a man-detecting unit 2z installed, for example, in the waiting zone w or on the sidewalk p functions as the man-detecting unit 2. The other components are the same as those in the pedestrian-crossing support system 1 described above, and the detailed description will be omitted.

Figure 17:
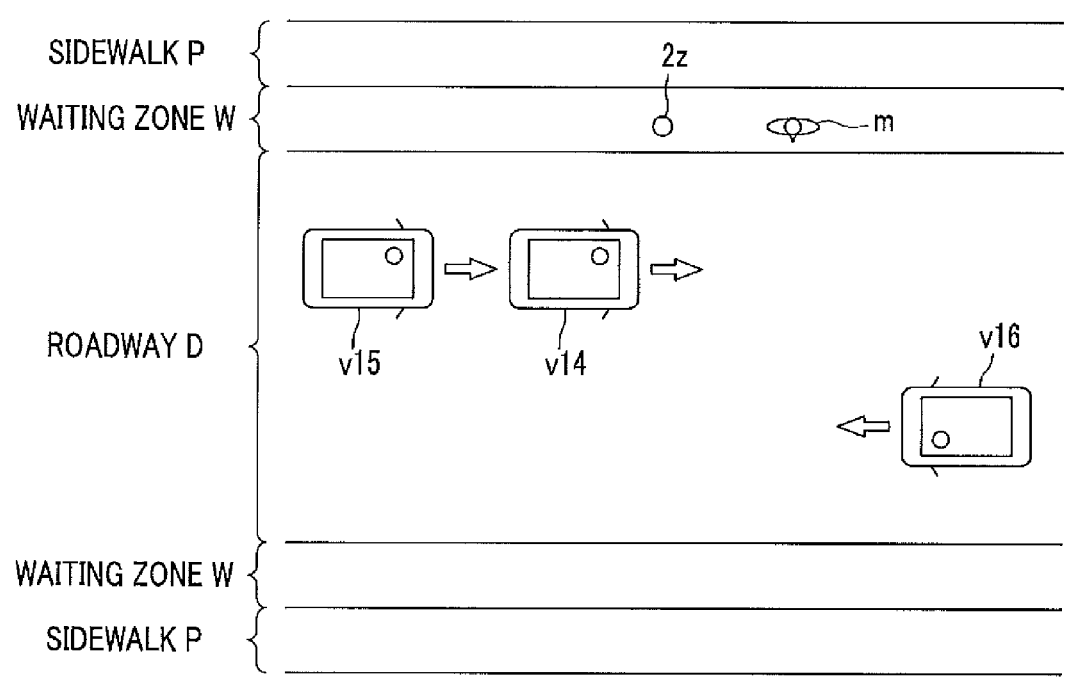
FIG. 17 is a plan view showing a situation in which the modification of the pedestrian-crossing support system is carried out.

FIG. 17 is a plan view showing a situation in which the modification of the pedestrian-crossing support system is carried out. FIG. 17 shows the situation in which three of the vehicles v of a vehicle v14 to a vehicle v16 having the modification of the pedestrian-crossing support system 1 travel.

According to operations of the modification of the pedestrian-crossing support system 1, the man-detecting unit 2z is installed in the environment. Specifically, the man-detecting unit 2z is a unit detecting a man using, for example, a camera installed on a utility pole on a road. The man-detecting unit 2z is configured by a known technique used in, for example, a monitoring camera. The man-detecting unit 2z transmits the position information regarding the detected man m to the man-position/waiting-score calculating unit 5 of the pedestrian-crossing support system 1 mounted in the vehicle v through the communicating unit 4. After that, according to the same procedure as that of the pedestrian-crossing support system 1 described above, the operations of the vehicle v having the pedestrian-crossing support system 1 will be achieved.

The above configuration of the modification of the pedestrian-crossing support system 1 enables reduction in the cost of the pedestrian-crossing support system 1 mounted in the vehicle v. In an environment in which monitoring cameras have been installed on the road, the configuration of the modification has an advantage that installation of the man-detecting unit 2z is not necessary. The man-detecting unit 2z, which is installed on the road, detecting a man m has an advantage of improved precision for detecting the man m, compared to the man-detecting unit 2, which is mounted in the moving vehicle v, detecting the man m.

The embodiments provide a vehicle support system for a pedestrian to safely cross a road even when no crosswalk is installed on the road. Such vehicle system has an advantage of avoidance of a crash and safe travelling for both pedestrians and vehicles.

What is claimed is:

1. A vehicle support system for supporting a man in safely crossing a road, where the vehicle support system is mounted in a vehicle and comprising:
 a man-detecting unit detecting the man, the detecting being in a travelling direction of the vehicle;
 a vehicle-position detecting unit detecting a position of the vehicle;
 a man-position/waiting-score calculating unit determining the man detected by the man-detecting unit to be at least one potential-crossing-man who may cross the road, calculating an absolute position of the at least one potential-crossing-man as a man position using relative position information regarding the at least one potential-crossing-man relative to the vehicle and position information regarding the vehicle obtained by the vehicle-position detecting unit, measuring waiting time of the at least one potential-crossing-man to cross the road, calculating a waiting score, which is an index of waiting time for the at least one potential-crossing-man, and storing the calculated result in a man-position/waiting-score storing unit;

a stopping-vehicle determining unit determining whether or not the vehicle should be stopped to allow the at least one potential-crossing-man to begin crossing the road, based on the man position and the waiting score of the at least one potential-crossing-man;

a travelling controller for stopping the vehicle when the stopping-vehicle determining unit determines that the vehicle should be stopped; and a man-crossing-signal display unit displaying information to inform the at least one potential-crossing-man whether or not the at least one potential-crossing-man can safely cross the road, based on an instruction of the stopping-vehicle determining unit.

2. The vehicle support system according to claim 1, further comprising:

a road-map storing unit storing information regarding whether or not, in road map information, there is a waiting zone installed between a roadway and a sidewalk, the waiting zone for the man to wait for crossing the road, wherein when determining at least either of a case where the man in the waiting zone detected by the man-detecting unit stands still for a predetermined time, or a case where the man is taking a predetermined action for a predetermined time, the man-position/waiting-score calculating unit determines the detected man to be the at least one potential-crossing-man, and the stopping-vehicle determining unit determines that the vehicle should be stopped when the waiting score of the at least one potential-crossing-man exceeds a predetermined threshold.

3. The vehicle support system according to claim 1, further comprising:

a communicating unit communicating between the vehicle and a nearby vehicle around the vehicle, wherein the man-position/waiting-score calculating unit uses the communicating unit to share the position information regarding the man around the vehicle, with the nearby vehicle around the vehicle.

4. The vehicle support system according to claim 1, further comprising:

a communicating unit communicating between the vehicle and a nearby vehicle around the vehicle, wherein the stopping-vehicle determining unit determines whether or not the nearby vehicle is present between the man position and the vehicle based on position information regarding the nearby vehicle obtained using the communicating unit, and determines a stopping position of the vehicle.

5. The vehicle support system according to claim 1, wherein when determining that the vehicle should be stopped and upon confirming that the vehicle is stopped, the stopping-vehicle determining unit instructs the man-crossing-signal display unit to turn on a light indicating that the at least one potential-crossing-man can safely cross the road, and after an elapse of a predetermined time, the stopping-vehicle determining unit instructs the man-crossing-signal display unit to turn the light to flashing to indicate that the vehicle will start travelling.

6. The vehicle support system according to claim 2, wherein the road-map storing unit stores map information including a no-stopping zone as road information regarding an environment where the vehicle travels, and the stopping-vehicle determining unit refers to the road-map storing unit, and determines a stopping position to be set outside of the no-stopping zone.

7. The vehicle support system according to claim 2, wherein the at least one potential-crossing-man comprises a plurality of potential-crossing-men, and when the plurality of potential-crossing-men are present in the waiting zone, the man-position/waiting-score calculating unit groups the plurality of potential-crossing-men into a group if a predetermined condition is satisfied, and varies the waiting score according to the number of men in the group.

8. The vehicle support system according to claim 1, wherein when a man once detected by the man-detecting unit is not detected for a predetermined time period, the man-position/waiting-score calculating unit resets the waiting score of the at least one potential-crossing-man.

9. The vehicle support system according to claim 3, wherein the man-detecting unit is installed on a side of the vehicle, which corresponds to a side of the road on which the vehicle travels, and information regarding a man detected by the man-detecting unit is obtained through the communicating unit.

10. A method for supporting a man in safely crossing a road using a vehicle-mounted system which includes a man-detecting unit detecting the man in a travelling direction of a vehicle, a vehicle-position detecting unit detecting a position of the vehicle, a man-position/waiting-score calculating unit, a stopping-vehicle determining unit, a travelling controller, and a man-crossing-signal display unit, the method comprising:

with the man-position/waiting-score calculating unit, determining the man detected by the man-detecting unit to be at least one potential-crossing-man who may be waiting to cross the road, calculating an absolute position of the at least one potential-crossing-man as a man position using relative position information regarding the at least one potential-crossing-man relative to the vehicle and position information regarding the vehicle obtained by the vehicle-position detecting unit, measuring waiting time that the at least one potential-crossing-man is waiting to begin crossing the road, calculating a waiting score, which is an index of waiting time for the at least one potential-crossing-man, and storing the calculated result in a man-position/waiting-score storing unit; and with the stopping-vehicle determining unit, determining whether or not the vehicle should be stopped to allow the at least one potential-crossing-man to begin crossing the road, based on the man position and the waiting score of the at least one potential-crossing-man, and when determining that the vehicle should be stopped, instructing the travelling controller to stop the vehicle and instructing the man-crossing-signal display unit to display information indicating that the at least one potential-crossing-man can safely cross the road.

11. The method according to claim 10, the vehicle system further including a road-map storing unit storing information regarding whether or not, in road map information, there is a waiting zone installed between a roadway and a sidewalk, the waiting zone for the man to wait for crossing the road, the method further comprising:

with the man-position/waiting-score calculating unit, when determining at least either of a case where the man in the waiting zone detected by the man-detecting unit stands still for a predetermined time, or a case where the man is taking a predetermined action for a predetermined time, determining the detected man to be the at least one potential-crossing-man; and with the stopping-vehicle determining unit, determining that the vehicle should be stopped when the waiting score of the at least one potential-crossing-man exceeds a predetermined threshold.

12. The vehicle support system according to claim 4, wherein the man-detecting unit is installed on a side of the road on which the vehicle travels, and information regarding a man detected by the man-detecting unit is obtained through the communicating unit.

13. A vehicle support system for supporting a man in safely crossing a non-crosswalked road, where the vehicle support system is mounted in a vehicle and comprising:

a man-detecting unit detecting the man, the detecting being in a travelling direction of the vehicle;

a vehicle-position detecting unit detecting a position of the vehicle;

a man-position/waiting-score calculating unit determining the man detected by the man-detecting unit to be at least one potential-crossing-man who may cross the non-crosswalked road, calculating an absolute position of the at least one potential-crossing-man as a man position using relative position information regarding the at least one potential-crossing-man relative to the vehicle and position information regarding the vehicle obtained by the vehicle-position detecting unit, measuring waiting time of the at least one potential-crossing-man to cross the non-crosswalked road, calculating a waiting score, which is an index of waiting time for the at least one potential-crossing-man, and storing the calculated result in a man-position/waiting-score storing unit;

a stopping-vehicle determining unit determining whether or not the vehicle should be stopped to allow the at least one potential-crossing-man to begin crossing the non-crosswalked road, based on the man position and the waiting score of the at least one potential-crossing-man;

a travelling controller for stopping the vehicle when the stopping-vehicle determining unit determines that the vehicle should be stopped; and a man-crossing-signal display unit displaying information to inform the at least one potential-crossing-man whether or not the at least one potential-crossing-man can safely cross the non-crosswalked road, based on an instruction of the stopping-vehicle determining unit.

* * * * *